US011508155B2

(12) United States Patent
Hu

(10) Patent No.: US 11,508,155 B2
(45) Date of Patent: Nov. 22, 2022

(54) METHODS, SYSTEMS, APPARATUSES, AND DEVICES FOR FACILITATING MANAGING INCIDENTS OCCURRING IN AREAS MONITORED BY LOW DATA-RATE MONITORING DEVICES USING THE LOW DATA-RATE MONITORING DEVICES

(71) Applicant: MatchX GmbH, Berlin (DE)

(72) Inventor: Xin Hu, Berlin (DE)

(73) Assignee: MATCHX GMBH

( * ) Notice: Subject to any disclaimer, the term of this patent is extended or adjusted under 35 U.S.C. 154(b) by 95 days.

(21) Appl. No.: 17/321,399

(22) Filed: May 14, 2021

(65) Prior Publication Data

US 2021/0357657 A1 Nov. 18, 2021

Related U.S. Application Data

(60) Provisional application No. 63/024,678, filed on May 14, 2020.

(51) Int. Cl.

*G06V 20/52* (2022.01)
*G06K 9/62* (2022.01)
*H04N 7/18* (2006.01)
*H04N 5/91* (2006.01)
*G06N 5/04* (2006.01)
*G08B 21/18* (2006.01)
*G06N 20/00* (2019.01)

(Continued)

(52) U.S. Cl.

CPC ........... *G06V 20/52* (2022.01); *G06K 9/6256* (2013.01); *G06N 5/04* (2013.01); *G06N 20/00* (2019.01); *G06V 10/955* (2022.01); *G06V 20/49* (2022.01); *G08B 21/18* (2013.01); *H04N 5/91* (2013.01); *H04N 7/181* (2013.01); *G06V 20/44* (2022.01)

(58) Field of Classification Search

CPC ...... G06V 20/52; G06V 20/49; G06V 10/955; G06V 20/44; G06N 20/00; G06N 5/04; G06K 9/6256; G08B 21/18; H04N 5/91; H04N 7/181

See application file for complete search history.

(56) References Cited

U.S. PATENT DOCUMENTS

2018/0150750 A1* 5/2018 Verdejo .................. G06V 10/84
2019/0289263 A1* 9/2019 Amini ................. H04L 41/0806
2020/0134298 A1* 4/2020 Zavesky ................ H04N 7/157

* cited by examiner

*Primary Examiner* — Sunghyoun Park

(57) ABSTRACT

Disclosed herein is a system for facilitating managing incidents occurring in areas monitored by low data-rate monitoring devices using the low data-rate monitoring devices, in accordance with some embodiments. Accordingly, the system comprises a processor, a device server, and a data visualization device. Further, a camera of a low data-rate monitoring device is configured for capturing video of an area. Further, the processor comprises a machine learning (ML) hardware accelerator configured for performing machine learning processing of the video. Further, the processor is configured for generating processed data. Further, the device server is configured for receiving the processed data based on the transmitting of the processed data from a low data-rate transceiver of the low data-rate monitoring device and transmitting a notification to a device. Further, the data visualization device is configured for visualizing the processed data, identifying an incident in the area, and generating the notification for the incident.

20 Claims, 18 Drawing Sheets

(51) Int. Cl.

| | |
|---|---|
| ***G06V 10/94*** | (2022.01) |
| ***G06V 20/40*** | (2022.01) |

METHODS, SYSTEMS, APPARATUSES, AND DEVICES FOR FACILITATING MANAGING INCIDENTS OCCURRING IN AREAS MONITORED BY LOW DATA-RATE MONITORING DEVICES USING THE LOW DATA-RATE MONITORING DEVICES

The current application claims a priority to the U.S. Provisional Patent application Ser. No. 63/026,678 filed on May 14, 2020.

FIELD OF THE INVENTION

Generally, the present disclosure relates to the field of data processing. More specifically, the present disclosure relates to methods, systems, apparatuses, and devices for facilitating managing incidents occurring in areas monitored by low data-rate monitoring devices using the low data-rate monitoring devices.

BACKGROUND OF THE INVENTION

AI may bring out possibilities to enable usage scenarios like logistics, industrial 4.0, fire detection, parking management with low data-rate devices (ex: transmission range 20 km and battery life of 3 years), and these devices are usually installed and operated in spaces like rooftop, basements or streets. These devices carried with ML can be referred to as AI devices which may represent a significant growth opportunity for low data-rate devices, including security cameras, parking cameras, fire detection cameras that may span with computing video and Therefore, there is a need for improved methods, systems, apparatuses, and devices for facilitating managing incidents occurring in areas monitored by low data-rate monitoring devices using the low data-rate monitoring devices that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a system for facilitating managing incidents occurring in areas monitored by low data-rate monitoring devices using the low data-rate monitoring devices, in accordance with some embodiments. Accordingly, the system may include a processor, a device server, and a data visualization device. Further, the processor may be configured to be communicatively coupled with at least one low data-rate monitoring device. Further, the least one low data-rate monitoring device may include at least one camera and a low data-rate transceiver. Further, the at least one camera and the low data-rate transceiver may be communicatively coupled. Further, the at least one camera may be configured for capturing at least one video of at least one area. Further, the processor may include a machine learning (ML) hardware accelerator. Further, the ML hardware accelerator may be configured for performing machine learning processing of the at least one video for performing video recognition based on the capturing. Further, the processor may be configured for generating processed data based on the performing of the machine learning processing. Further, the device server may be communicatively coupled with the least one low data-rate monitoring device. Further, the low data-rate transceiver may be configured for transmitting the processed data to the device server. Further, the device server may be configured for receiving the processed data based on the transmitting of the processed data. Further, the device server may be configured for transmitting a notification to at least one device. Further, the data visualization device may be communicatively coupled with the device server. Further, the data visualization device may be configured for visualizing the processed data. Further, the data visualization device may be configured for identifying an incident in the at least one area based on the visualizing. Further, the data visualization device may be configured for generating the notification for the incident based on the identifying.

Further disclosed herein is a system for facilitating managing incidents occurring in areas monitored by low data-rate monitoring devices using the low data-rate monitoring devices, in accordance with some embodiments. Accordingly, the system may include a processor, a device server, a data visualization device, a controller, and a memory device. Further, the processor may be configured to be communicatively coupled with at least one low data-rate monitoring device. Further, the least one low data-rate monitoring device may include at least one camera and a low data-rate transceiver. Further, the at least one camera and the low data-rate transceiver may be communicatively coupled. Further, the at least one camera may be configured for capturing at least one video of at least one area. Further, the processor may include a machine learning (ML) hardware accelerator. Further, the ML hardware accelerator may be configured for performing machine learning processing of the at least one video for performing video recognition based on the capturing. Further, the processor may be configured for generating processed data based on the performing of the machine learning processing. Further, the device server may be communicatively coupled with the least one low data-rate monitoring device. Further, the low data-rate transceiver may be configured for transmitting the processed data to the device server. Further, the device server may be configured for receiving the processed data based on the transmitting of the processed data. Further, the device server may be configured for transmitting a notification to at least one device. Further, the data visualization device may be communicatively coupled with the device server. Further, the data visualization device may be configured for visualizing the processed data. Further, the data visualization device may be configured for identifying an incident in the at least one area based on the visualizing. Further, the data visualization device may be configured for generating the notification for the incident based on the identifying. Further, the controller may be communicatively coupled with the processor. Further, the controller may be configured for activating the ML hardware accelerator based on a ML accelerator schedule. Further, the performing of the machine learning processing of the at least one video may be based on the activating of the ML hardware accelerator. Further, the memory device may be communicatively coupled with the controller. Further, the memory device may be configured for storing the ML accelerator schedule.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
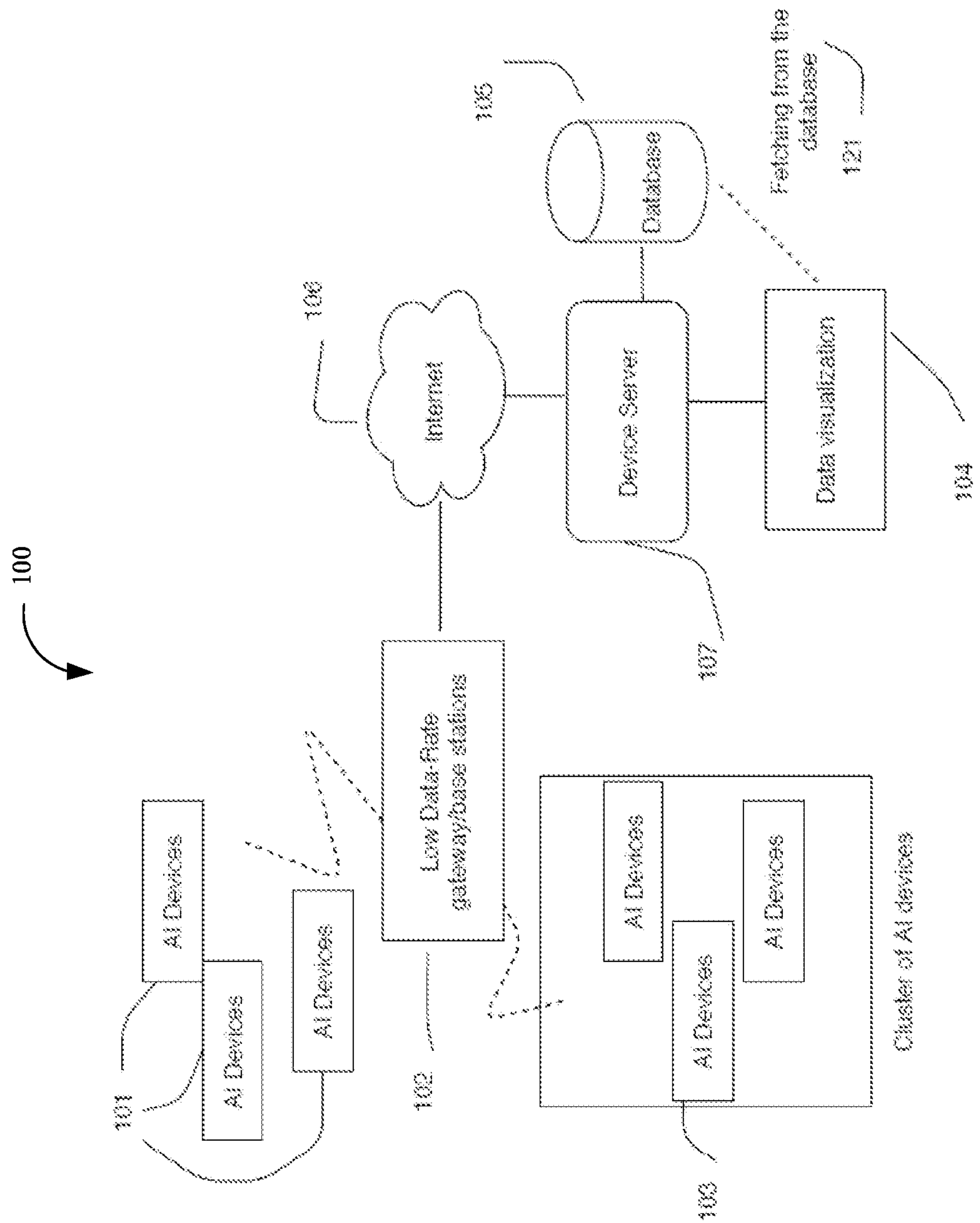
FIG. 1 is a block diagram of a system for facilitating video recognition using AI devices, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being “preferred” is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, “a” and “an” each generally denotes “at least one,” but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating managing incidents occurring in areas monitored by low data-rate monitoring devices using the low data-rate monitoring devices, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more, and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices for facilitating managing incidents occurring in areas monitored by low data-rate monitoring devices using the low data-rate monitoring devices.

Further, the present disclosure relates to the methods of video recognition by transmitting a low data-rate radio frequency (RF) signal with Machine Learning (ML) hardware acceleration. In particular, the present disclosure relates to a method about Artificial Intelligence (AI) recognition of video through ML and sending the data by low data-rate RF like Lora, NB-IoT, or Sigfox.

In one embodiment, ML is used for video recognition for low data-rate devices. The video recognition can be provided by ML hardware accelerators in AI devices. The AI device captures the video stream and processes it into small pieces of data results. The AI device can send a small amount of processed data to the cloud for data visualization through a low data-rate transceiver.

The AI device is configured to capture the video stream via an ML hardware accelerator that is configured to provide video recognition. For example, if there is a fire outbreak, the ML hardware accelerator will provide video recognition that is processed and sent by an AI device via the low data-rate transceiver to the cloud for data visualization. Thus, notifying the system that there is a fire outbreak.

The AI device capturing the video stream can be individually acting or in a group as a cluster of AI devices. The scope of the invention covers the use of ML for video recognition and the use of AI devices for processing the data into segments that can be stored in the database. The data recognition system is used for data visualization and calculation of local image properties along with AI accelerators. Big possibilities can come from analyzing this data.

Further, the present disclosure provides systems for video recognition using an AI device. The AI device captures video streams, processes data signals with Machine Learning (ML) hardware acceleration, and sends the data using low data-rate radio frequency (RF). In particular, the present disclosure relates to a method about Artificial Intelligence (AI) recognition of video through ML and transmission of data by low data-rate radiofrequency.

FIG. 1 is a block diagram of a system 100 for facilitating video recognition using AI devices 101, in accordance with some embodiments. FIG. 1 is a system diagram for video recognition by transmitting a low data-rate RF signal with ML hardware acceleration according to some embodiments.

FIG. 1 includes a plurality of AI devices 101, Low data-rate gateway/base stations 102, cluster of AI devices 103, data visualization 104, database 105, an Internet (e.g., world wide web) 106, device server 107, and fetching from database mechanism 121. The low-data rate gateway/base stations carry the data/information to the database.

The AI device 101 is a user equipment (UE) configured to communicate via the low data-rate transceiver. The UE may include any type of computing device. Example UEs include security cameras, parking cameras, fire detection cameras, and the like. The UEs may include a plurality of applications installed and running on the UEs which may periodically communicate data over the low data-rate devices using lower radiofrequency.

As used herein, the AI devices 101 send the processed data using a low-data transceiver with transmission as low as 250 KB. For example, the AI devices are equipped with a low data rate radio frequency (RF). A low data-rate RF like Lora, NB-IoT, or Sigfox can be used. However, Lora, NB-IoT, or Sigfox are used as an example and are not intended to be limiting. Other types of low-data rate RF can be used instead.

The AI devices 101 can automatically activate their transmission when the video is captured. In some embodiments, manual activation can be used. For example, if the AI device is in sleeping mode, an internal configuration can be changed automatically or manually.

FIG. 1 illustrates a portion of the AI devices 103 in a cluster and other AI devices not in a cluster 101. At least one of the AI devices in cluster 103 may be a master AI device that can distribute the data to other AI devices 103 in the cluster.

The low-data rate transceiver 205 can include hardware and software configured to dedicatedly receive and send processed data through the low-data rate gateway/base station 102. Such a low data-rate transceiver 205 may be unable to perform other functions other than transmitting data. The low data-rate transceiver 205 can also be configured with other devices to make it a multipurpose system.

In some embodiments, the AI devices 101 send data through low data-rate transceiver 205 using low data-rate RF. As used herein, a low data-rate transceiver 205 is configured to send and receive data. This data is further transmitted to the cloud for data storage and visualization.

In some embodiments, the AI devices 101 communicate with the internet through low data-rate transceiver 205 via low data-rate gateway/base stations 102.

Figure 3:
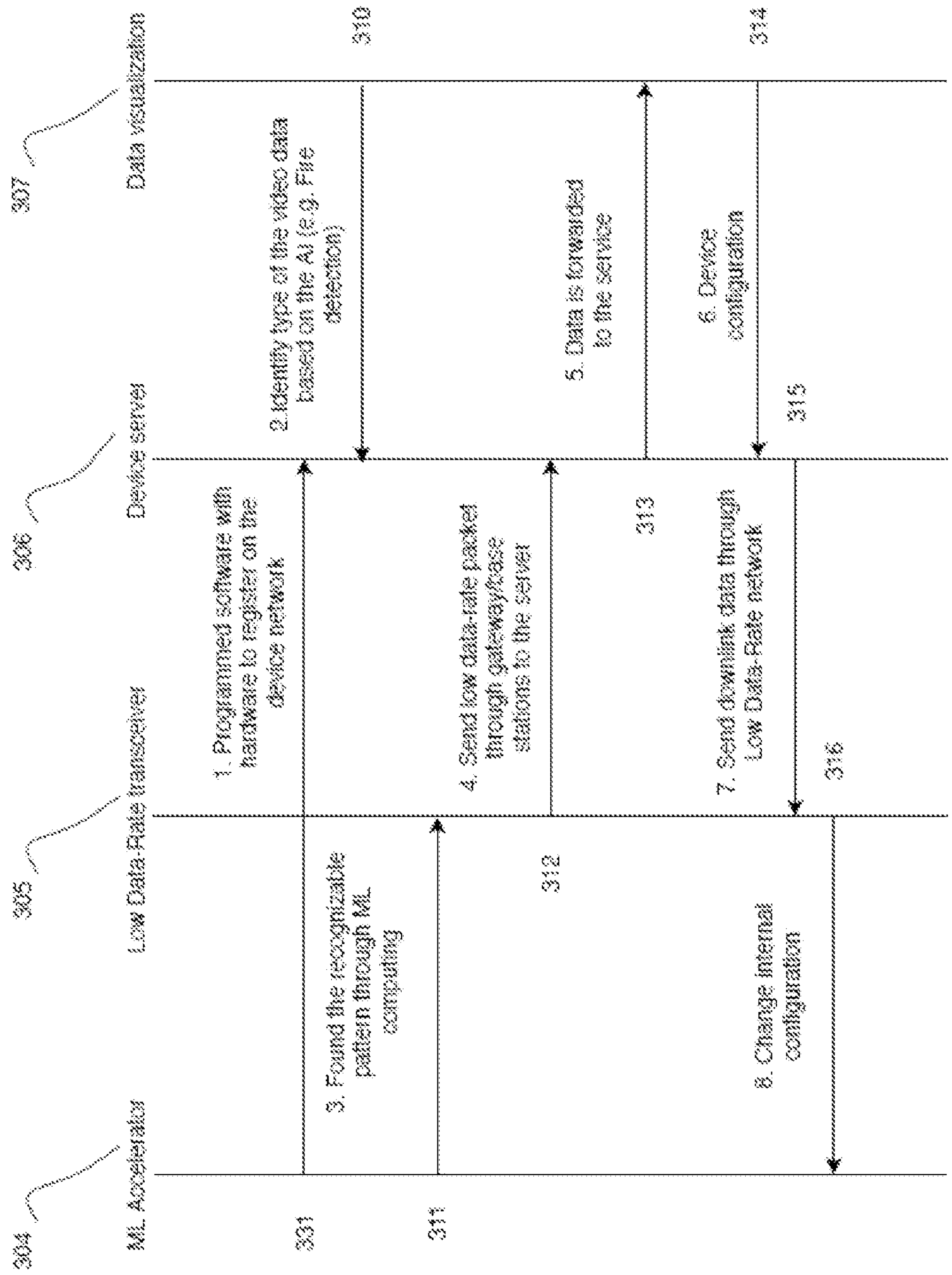
FIG. 3 illustrates a timing diagram associated with the system for facilitating the video recognition, in accordance with some embodiments.

The AI devices 101 receives commands through the low data-rate transceiver 205 from the device server 107 for an internal configuration change. FIG. 3 further describes this mechanism of information transfer to the AI devices.

The device server 107 provides commands to the AI devices 101 by communicating via internet 106. The commands can travel from the device server 107 via internet 106 and through the low data-rate gateway/base stations 102 to the AI devices.

In some embodiments, the data visualization device can employ different protocols to communicate with the AI devices 101 using device server 107. The data visualization device can also communicate with the AI devices 101 to establish an authenticated session and/or to establish a secure session. An authenticated session and the secure session are further described in FIG. 5

Figure 2:
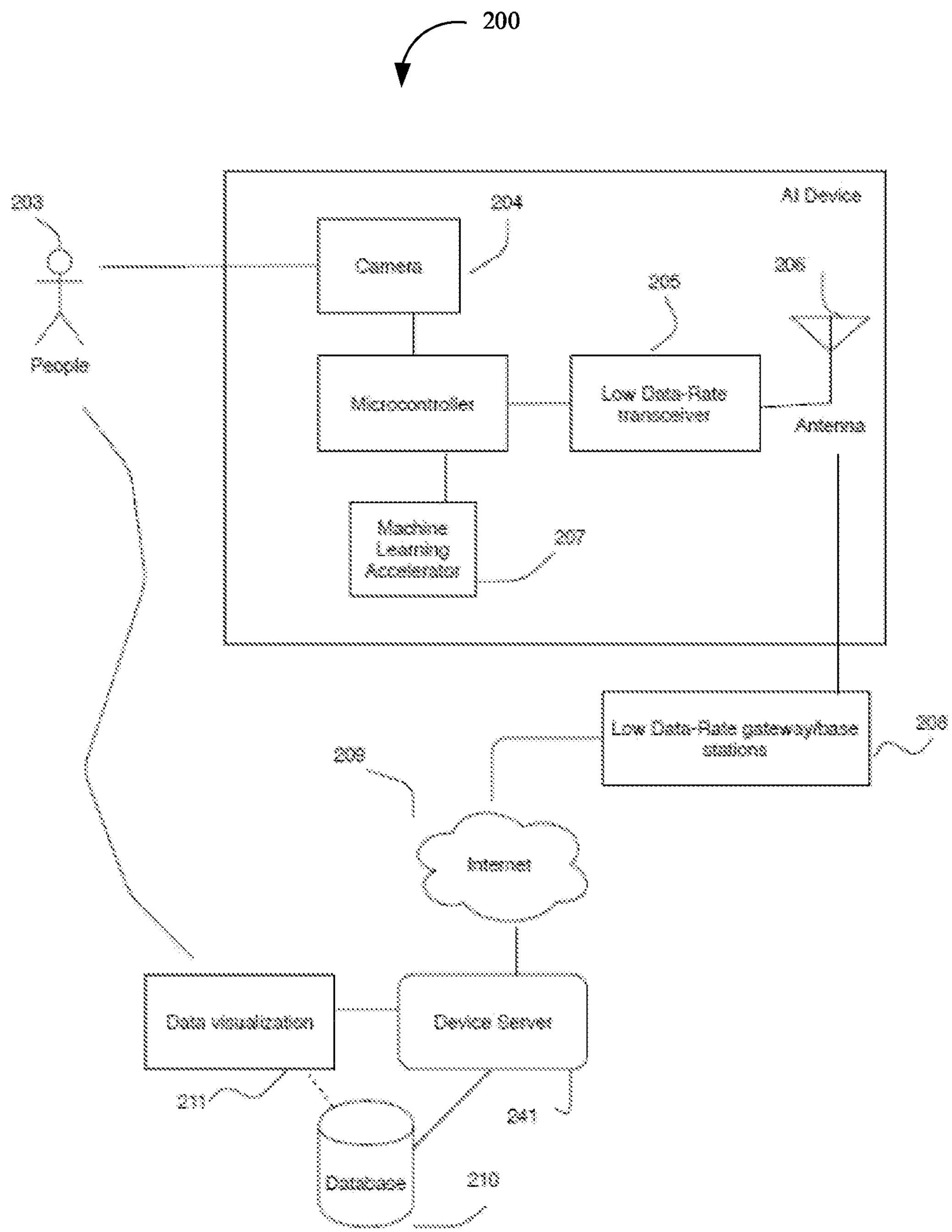
FIG. 2 is a block diagram of a system for facilitating video recognition using the AI devices, in accordance with some embodiments.

FIG. 2 is a block diagram of a system 200 for facilitating video recognition using the AI devices 101, in accordance with some embodiments. FIG. 2 is a system diagram for video recognition by transmitting a low data-rate RF signal with ML hardware acceleration according to one embodiment. FIG. 2. includes people (e.g., for people counting application) 203, camera equipment 204, microcontroller (No number given to the microcontroller—212), Low Data-rate transceiver 205, Antenna 206, Machine Learning (ML) Accelerator 207, Low Data-rate gateway/base 208 which is analogous to Low Data-rate gateway/base 102, Internet 209 which is analogous to internet 106, data visualization 211, database 210 which is analogous to database 105, a device server 241 which is analogous to the device server 107.

The AI device can include camera 204, microcontroller 212, low data-rate transceiver 205, antenna 206, Machine learning (ML) accelerator 207.

A low data-rate transceiver 205 is with an antenna 206 to transmit/receive data to/from low data-rate gateway/base stations. A low data-rate transceiver can be configured in a way to communicate with the microcontroller and database system 210 via internet 209.

The AI device is equipped with a low data-rate RF including a low data-rate transceiver 205 to send and receive data. This data is transmitted through low data-rate gateway/base stations to the device server 241 via the Internet. The data is visualized in the data visualization system 211 and all the data is stored in database 210.

In the example provided in FIG. 2, the camera 204 in the AI device captures the video streaming, the microcontroller 212 and ML accelerator connected to the camera processes the video stream and sends the data to the data visualization system through low data-rate transceiver 205. The low data-rate transceiver 205 can communicate with the device server 241 through low data-rate gateway/base stations 208 and internet 209.

The RF used for communication can be any low data-rate RF like Lora, NB-IoT, or Sigfox.

The low data-rate transceiver 205 can communicate with the low data-rate gateway/base stations 208. The low data-rate gateway/base stations 208 can communicate with the device server 241 via internet 209. The data server 241 can communicate with the database 210 and data visualization system 211.

By the way of not limiting example, people 203 can be used as a source of data for the AI device camera 204. For example, in the people counting model, the source is people 203. The data is captured by the camera 204 and the data is further sent to the ML accelerator 207 for processing.

The ML accelerator 207 in the AI device can authenticate itself to register on the device network of the device server 241. The database 210 can store information from people/surrounding 203 captured in the form of a video stream and later processed as data received by the AI device.

The database 210 is linked with data visualization 211 and the device server 241. The information from the AI device can be transmitted to the data visualization system 211 by database 210 and commands can be sent from data visualization system 211 to the device via the device server 241. FIG. 3 further describes this process.

FIG. 3 illustrates a timing diagram associated with the system 100 for facilitating the video recognition, in accordance with some embodiments. FIG. 3 is a timing diagram for recognizing a video content with low data-rate RF and ML hardware acceleration according to one embodiment. FIG. 3 includes ML Accelerator 304, Low data-rate transceiver 305 which is analogous to Low data-rate transceiver 205, a device server 306 which is analogous to the device server 107, data visualization 307 which is analogous to data visualization 105.

The ML accelerator 304 can activate 331 programmed software with hardware registered on the device network. In some embodiment, the ML accelerator 304 can communicate with the device server 306 via low data-rate transceiver 205 to inform the device server 306 that the programmed software with hardware is registered on the device network.

The data visualization 307 can send 310 identified types of the video data based on the AI (e.g. Fire detection). In some embodiments, the data visualization 307 determines the type of video data that has been captured by the AI device 101. The data visualization 307 can communicate with the device server 306 and send 310 identifying the type of video data captured via different communication mediums (e.g. internet).

The ML accelerator 304 pushes 311 found the recognizable pattern through ML computing to the low data-rate transceiver 305. In some embodiment, the ML accelerator 304 can determine the recognizable pattern by ML computing. The ML accelerator 304 sends this information to the low data-rate transceiver 305. The low data-rate transceiver 305 communicates with the device server 306 by pushing 312 and sends a low data-rate packet through gateway/base stations 208 to the server.

In some embodiment, the low data-rate transceiver 305 sends low data-rate packets to the device server 306 via gateway/base stations using low radio frequency (RF). As used herein, this low RF can be Lora, NB-IoT, Sigfox, or any other low RF with a low data rate (e.g., 250 KB).

The device server 306 pushes data to the service 313. In some embodiment, the device service 306 can forward data received from ML accelerator 304 via low data-rate transceiver 305 to data visualization 307. The low data-rate transceiver 305 communicates with the device server 306 through low data-rate gateway/base stations by sending low data-rate packets via low RF.

In some embodiment, the data visualization 307 can request device configuration 314. The data visualization system can send a request to the device server 306 for configuring the device (e.g., changing the sleeping time of the AI device).

The device server 306 receives the request 314 and forwards 315 the request to low data-rate transceiver 305. The low data-rate transceiver 305 forwards 316 the request to the ML accelerator 304. That is, the device server 306 relays commands to the ML accelerator 304 via the low-data rate transceiver 305 and low-data rate gateway/base stations 208. The ML accelerator 304 receives the request for change in internal configuration (e.g., change in sleeping time) via low data-rate transceiver 305.

In some embodiment, the device server receives 314 the request for device configuration. The device server 314 notifies the ML accelerator 304 through low data-rate transceiver 305. The device server 306 communicates with the low data-rate transceiver by 316 sending downlink data through a low data-rate packet. The ML accelerator 304 receives the request and enables change in internal configuration.

Figure 5:
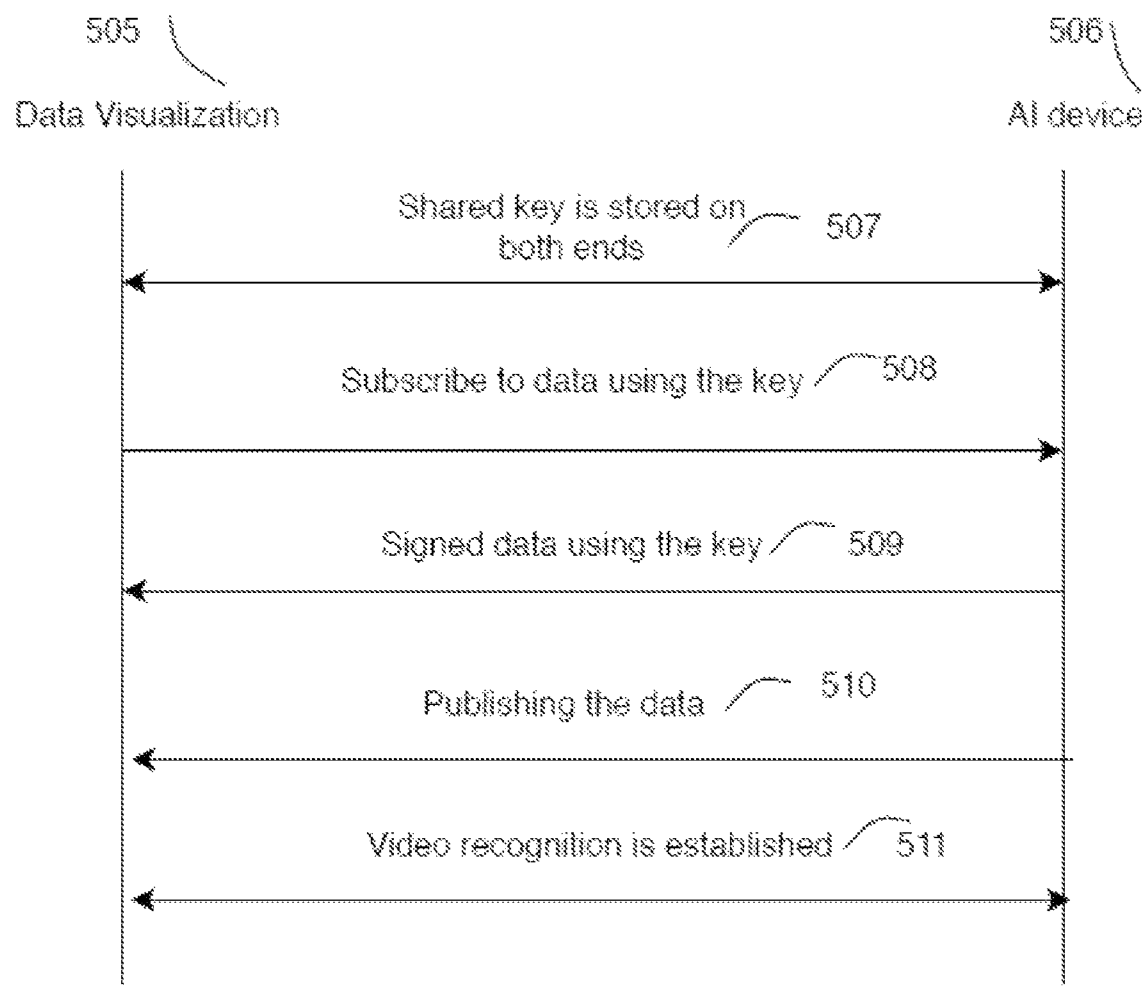
FIG. 5 illustrates a timing diagram for establishing a session between devices of the system, in accordance with some embodiments.

In some embodiments, the AI device 101 can initiate an authentication session and/or a secured session using a shared key provided by the data visualization system 307. FIG. 5 further describes an authenticated session and/or a secure session.

The internal configuration of the AI device 107 is changed in response to the request from data visualization 307. This can ensure automatic changes in the configuration of the AI device 101 without human intervention.

Figure 4:
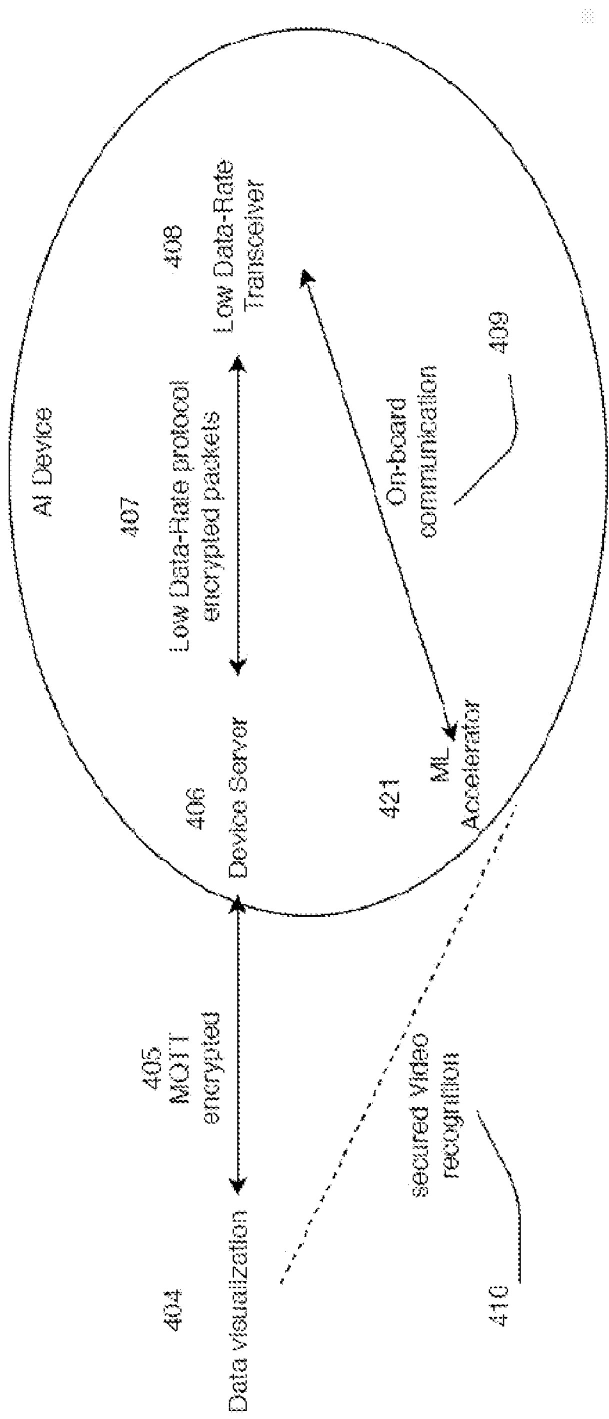
FIG. 4 illustrates security protocols employed in the system for facilitating the video recognition, in accordance with some embodiments.

FIG. 4 illustrates security protocols employed in the system 100 for facilitating the video recognition, in accordance with some embodiments. FIG. 4 is a diagram illustrating the security protocols employed in recognizing a video content with low data-rate RF and ML hardware acceleration according to one embodiment. FIG. 4 includes data visualization 404 analogous to data visualization 104, MQTT encrypted 405, a device server 406 analogous to the device server 107, low data-rate protocol encrypted packets 407, Low data-rate transceiver 408 analogous to 205, On-board communication 409 mechanism, ML accelerator 421 which is analogous to 207 and secured Video recognition 410.

FIG. 4 also shows security protocols employed to secure communications between the device server 406 and data visualization 404, device server 406 and low data-rate transceiver 408, low data-rate transceiver 408, ML accelerator 421, and data visualization 404.

For example, communications between data visualization 404 and device server 406 over an internet are secured using MQ Telemetry Transport (MQTT) protocol 405. Communications between device server 406 and low data-rate transceiver 408 are secured using low data-rate protocol encrypted packets 407. The AI device includes low data-rate transceiver 408 and ML accelerator 421. Communications between Low data-rate transceiver 408 and ML accelerator 421 are on-board communications that take place in the AI device.

The data visualization 404 can identify the type of the video data based on the AI (e.g. Fire detection) and communicate with the ML accelerator 421 as described in FIG. 3. The communication between ML accelerator 421 and data visualization 404 is secured video recognition 410.

FIG. 5 illustrates a timing diagram for establishing a session between devices of the system 100, in accordance with some embodiments. FIG. 5 is a timing diagram for establishing an authenticated session according to one embodiment. FIG. 5 includes data visualization 505, AI device 506. In some embodiments, an authenticated session or/and secure session is established before data can be transferred from the data visualization 505 and/or received from the AI device 506. A low data-rate radiofrequency is used to transfer data from the AI device 506.

As used herein, an authenticated session describes a session wherein the AI device 506 confirms that the data visualization 505 is authorized to transfer data to the AI device 506. A secured session describes a session wherein the communication between the AI device 506 and data visualization 505 is secure from third parties.

The data visualization 505 transmits a key 507 to the AI device 506. The shared key is stored in the data visualization 505 and the Ai device 506. In one embodiment, the key 507 can be a random number and/or character.

Establishing a session includes starting a session using a key between the AI device 506 and data visualization 505. The key 507 is stored at both the ends of communication between AI device 506 and data visualization 505. The key is used to subscribe to the data 508 from the AI device 506 by the data visualization 505.

In establishing an authenticated session/and or a secure session, the AI device 506 can sign data using the key 509. The data can be received by the data visualization 505 using the key.

A request to initiate a connection 508 can be sent from data visualization 505 to the AI device 506. Data visualization 505 can subscribe to the data coming from AI device 506 using the key 508. The AI device 506 signs the data to the data visualization 505 using the key 508.

In some embodiment, the AI device 506 can publish the data to the data visualization 505. This data is processed by a video stream from ML accelerator 304. The data is transmitted through low data-rate transceiver 305 over low data-rate gateway/base stations 107 and via internet 106 to data visualization system 505.

Video recognition is established 511 when the AI device 506 publishes the data 510 to the data visualization 505. The video recognition data from the data visualization 505 can be sent back to the AI device 506.

Figure 6:
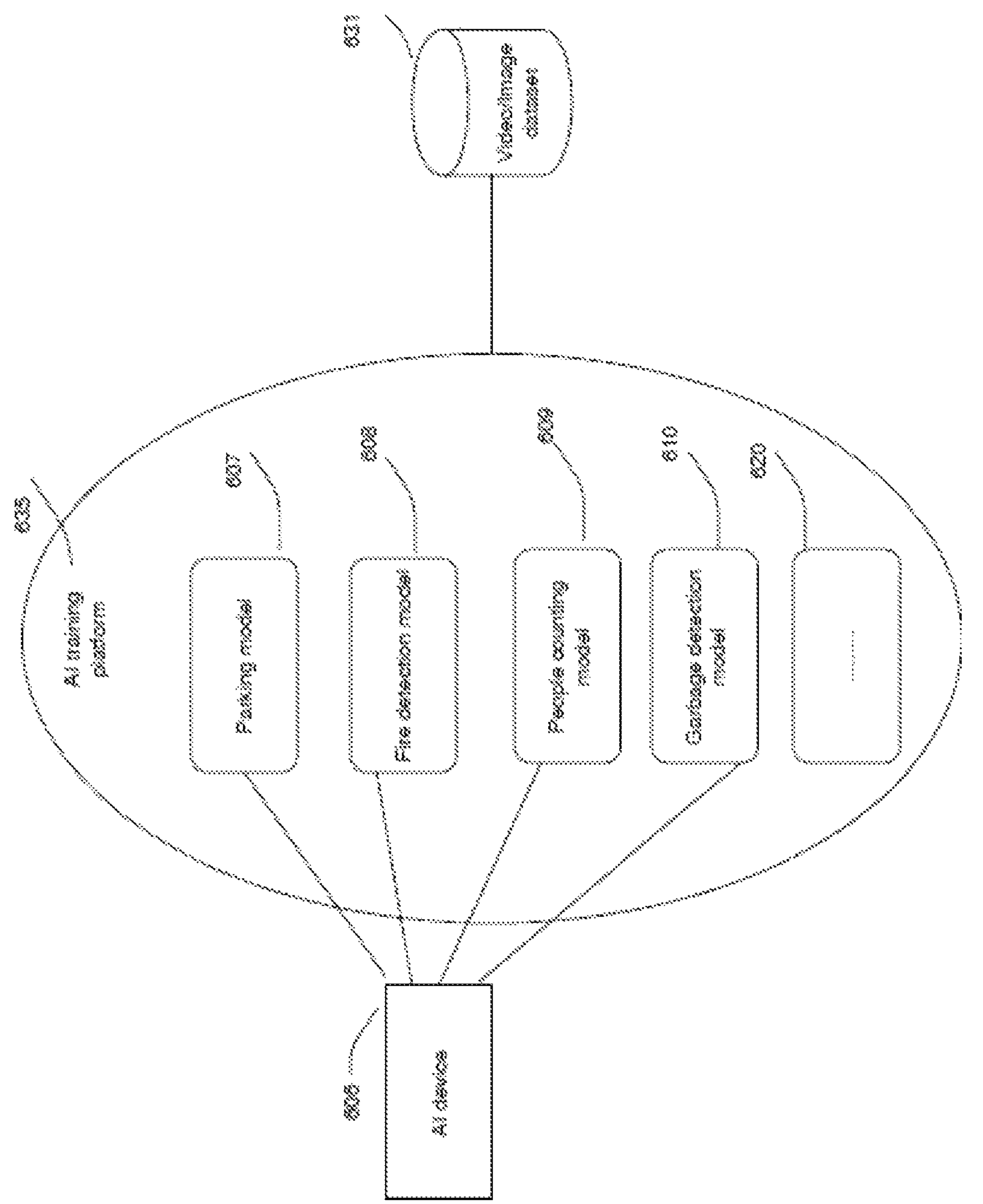
FIG. 6 is a block diagram of an AI training platform with the AI device and video/image dataset for facilitating the video recognition, in accordance with some embodiments.

FIG. 6 is a block diagram of an AI training platform 635 with the AI device 606 and video/image dataset 631 for facilitating the video recognition, in accordance with some embodiments. FIG. 6 is a block diagram showing AI training models according to one embodiment. FIG. 6 includes AI device 606, AI training AI 635, Parking model 607, Fire detection model 608, people counting model 609, garbage detection model 610, and other models 620, with video/image dataset 631.

In some embodiment, the video stream data received from the AI device 606 can be used to train AI models (e.g., parking model, fire detection model). The training can take place on an AI platform 635. The AI training platform 635 can train various AI models like Parking model 607, Fire detection model 608, people counting model 609, garbage detection model 610, and other models 620.

In some embodiment, the data from the models are stored in the Video/image dataset 631. This data can be further used to train similar models.

In one embodiment, the data from the models and AI device 606 can be utilized by the data visualization 505. This data can be stored in the database 105 for video recognition 511.

Figure 7:
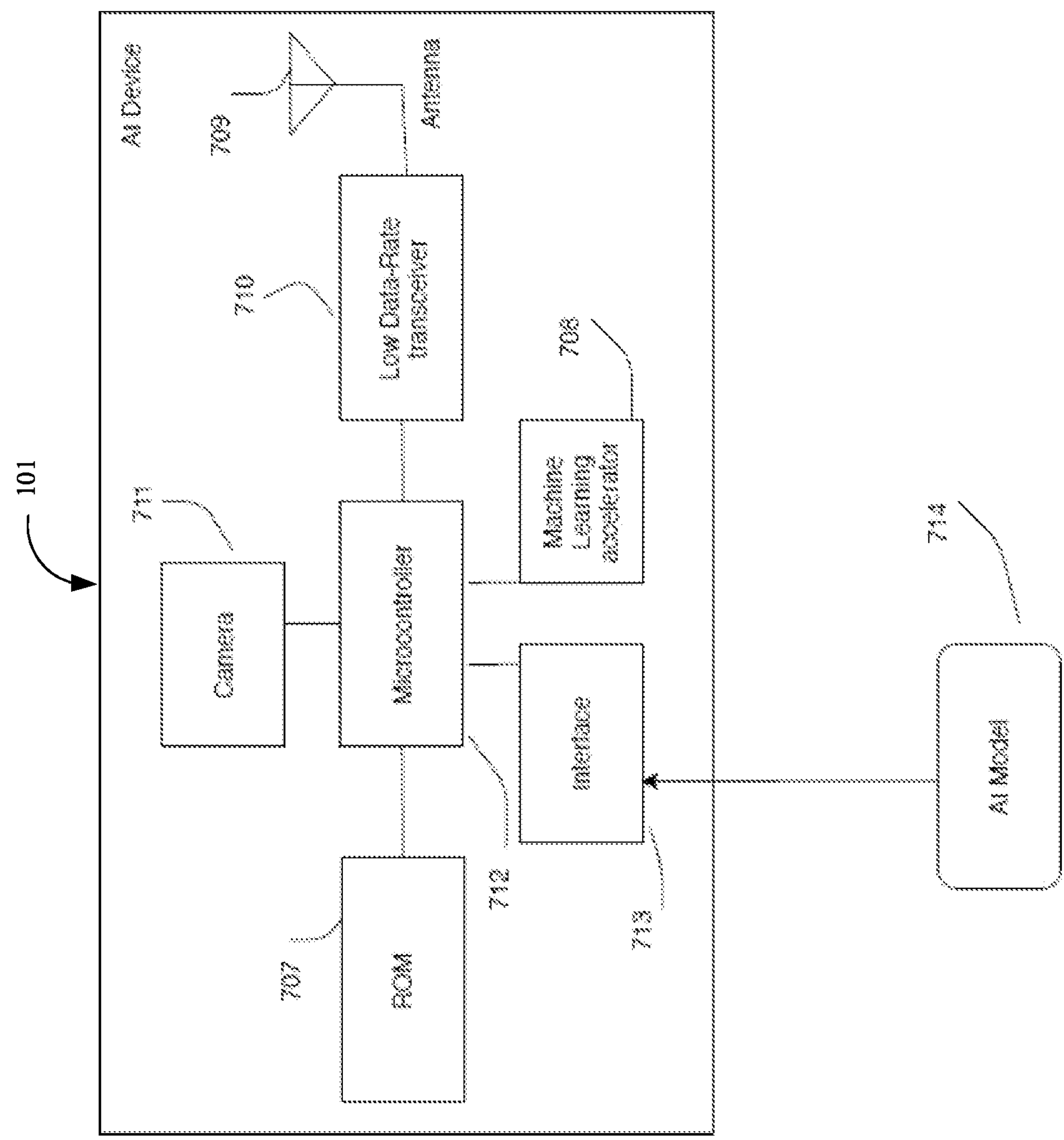
FIG. 7 is a block diagram of the AI device of the system, in accordance with some embodiments.

FIG. 7 is a block diagram of the AI device 101 of the system 100, in accordance with some embodiments. FIG. 7 is a block diagram illustrating AI device's circuitry in accordance with various embodiments. FIG. 7 includes ROM 707, ML accelerator 708 which is analogous to ML accelerator 207, antenna 709 which is analogous to antenna 206, low data-rate transceiver 710 which is analogous to low data-rate transceiver 205, camera 711, microcontroller 712 an interface 713, AI model 714. In some embodiments, the AI device 101 may be a device that implements all or part of AI device's functionality as hardware, memory, and/or software. In embodiments, the AI device 101 may also include camera 711, ROM 707, microcontroller 712, low data-rate transceiver 710, antenna 709, interface 713, ML accelerator 706. In some embodiments, the AI device 101 may be coupled with or include one or more plurality of antenna elements 709. The AI device 101 and/or components of the AI device 101 may be configured to perform operations similar to those described elsewhere in this disclosure.

In embodiments, where the AI device 101 has a memory 707 (e.g., ROM) that may be coupled to the microcontroller 712 and ML accelerator 708 for processing the video stream received from the camera 711. In embodiments, where the microcontroller is connected to the interface 713, the interface can be used for hardware driver circuits and/or external connections. As used herein, the AI model 714 is linked to the AI device 101 through the interface 713. In embodiments, where the low data-rate transceiver 710 is connected to the microcontroller 712 and antenna 709 for transmission/and or receiving data. The low data-rate transceiver 710 may be configured to perform operations similar to those described elsewhere in this disclosure.

Figure 8:
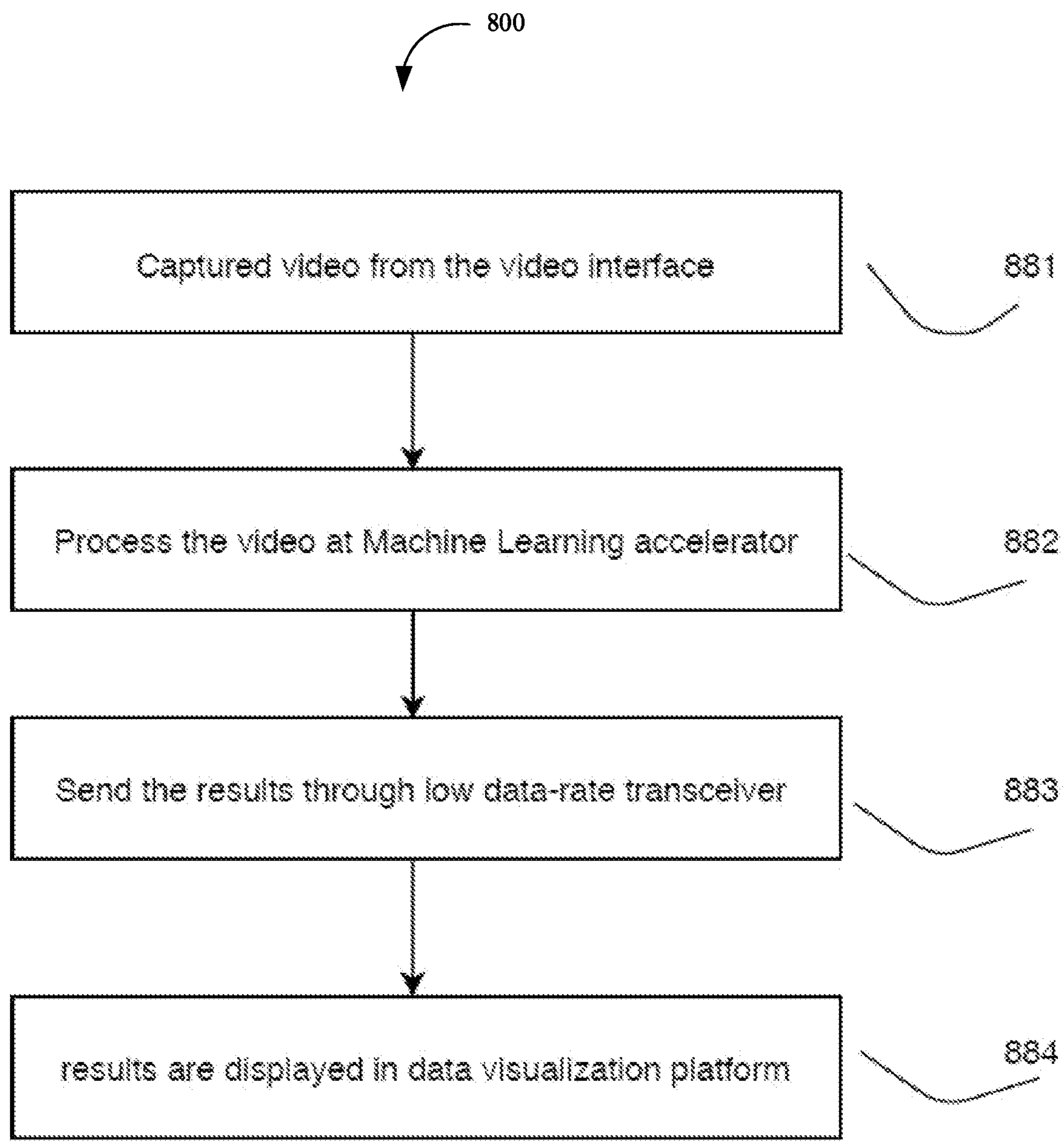
FIG. 8 is a flowchart of a method for facilitating the video recognition using the system, in accordance with some embodiments.

FIG. 8 is a flowchart of a method 800 for facilitating the video recognition using the system 100, in accordance with some embodiments. FIG. 8 is a block diagram illustrating the method 800 for video recognition by transmitting a low data-rate RF signal with ML hardware acceleration according to one embodiment. In some embodiments, the electronic device of FIG. 7 may be configured to perform one or more processes such as processes of FIG. 8. For example, in embodiments where the electronic device is, implements, is incorporated into, or is otherwise part of an AI camera, or a portion of an AI camera, the process may include receiving 881, by the AI camera, an indication that the video is captured from the video interface. The process may further include connecting 882, the video captured is processed at the Machine learning accelerator. Results are generated by the ML accelerator. The process may further include connecting 883, results generated are sent through low data-rate transceivers. The results produced are to be displayed. The process may further include receiving 884, the results generated by ML accelerator are displayed in the data visualization platform. In some examples, the data is stored and used to train AI models.

Figure 9:
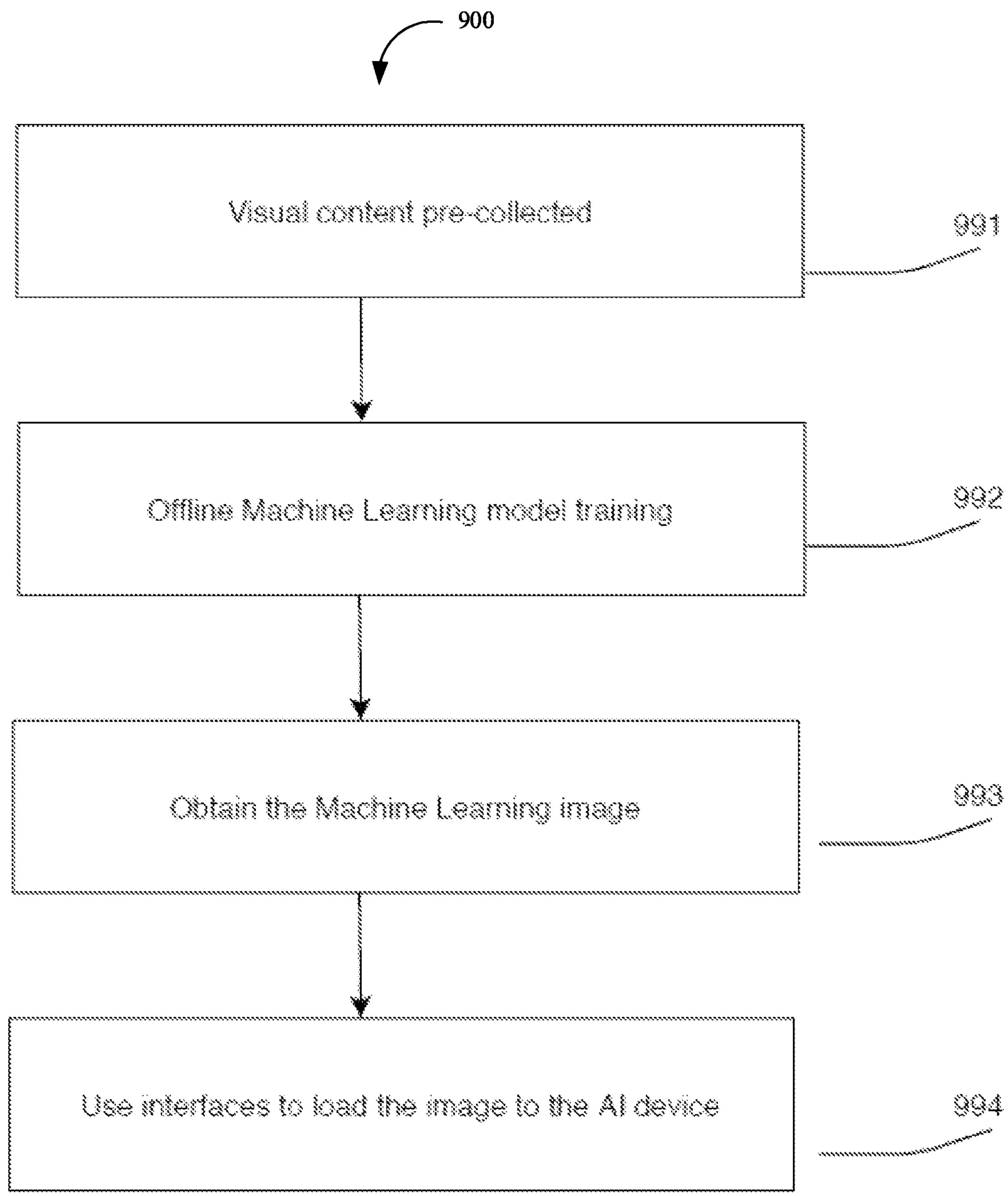
FIG. 9 is a flowchart of a method for facilitating the video recognition using the system, in accordance with some embodiments.

FIG. 9 is a flowchart of a method 900 for facilitating the video recognition using the system 100, in accordance with some embodiments. FIG. 9 is a block diagram illustrating the method 900 for video recognition by transmitting a low data-rate RF signal with ML hardware acceleration according to one embodiment. In some embodiments, the electronic device of FIG. 7 may be configured to perform one or more processes such as processes of FIG. 9. For example, in embodiments where the electronic device is, implements, is incorporated into, or is otherwise part of an AI camera, or a portion of an AI camera, the process may include receiving 991, by the AI camera, visual content is pre-collected and stored. The process may further include connecting 992, wherein the collected visual content is used for training Machine learning models offline. The process may further include connecting 993, a machine learning image is obtained from the process. This ML image can be further used for training various AI models. The process may further include connecting 994, interfaces are used to load the image to the AI device. In some examples, the video stream captured by the camera 711 and processed by the ML accelerator 708*c* in the AI device can be used to train AI model 714. FIG. 6 describes this process of AI model training.

In some embodiments, the video stream is collected and processed using the AI device 101. This processed data is pre-collected visual content 991. The data is fed to the offline Machine learning training model 992 to train the models. ML image obtained through the process 993 is sent to the AI device through interfaces. Further, the image is loaded to the AI device 994.

Figure 10:
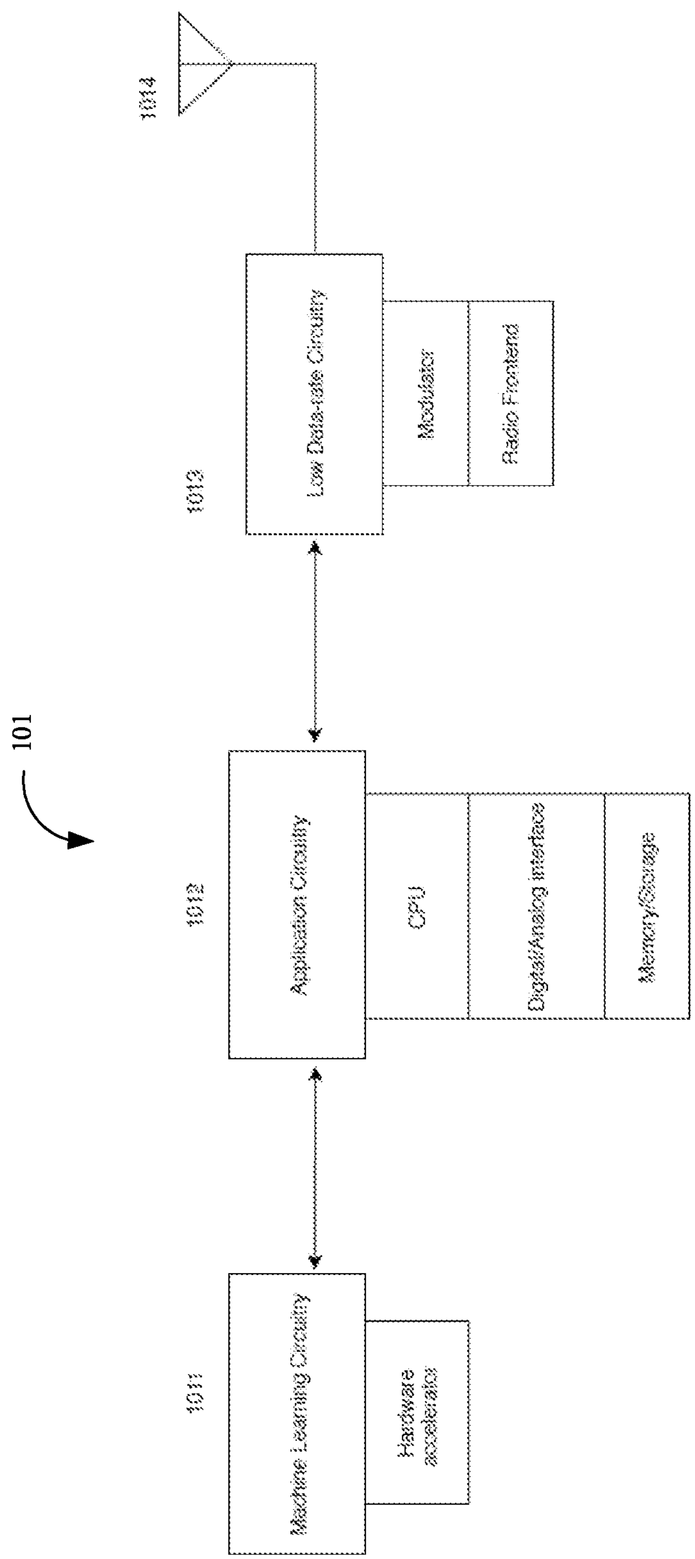
FIG. 10 is a block diagram of the AI device of the system, in accordance with some embodiments.

FIG. 10 is a block diagram of the AI device 101 of the system 100, in accordance with some embodiments. FIG. 10 is a block diagram illustrating components of the AI device 101 according to one embodiment.

In some embodiments, the AI device 101 may include Machine learning (ML) circuitry 1011, application circuitry 1012, Low data-rate circuitry 1013, and one or more antennas 1014, coupled together, as shown in FIG. 10.

The Machine Learning circuitry 1011 can include hardware accelerators. Hardware accelerators in the Machine Learning circuitry 1011 can be used to offload computing tasks into specialized hardware components within the system.

The Machine Learning circuitry 1011 may include one or more hardware accelerators like CPU accelerators. The Machine Learning circuitry 1011 may include one or more application processors. By way of non-limiting example, the Machine Learning circuitry 1011 may include one or more single-core or multi-core processors. The Processor(s) may include any combination of general-purpose processors and dedicated processors (e.g., graphics processors, application processors, etc.). The processor(s) may be operably coupled and/or include memory/storage and may be configured to execute instructions stored in the memory/storage.

The Machine Learning circuitry 1011 may include hardware accelerators that are reconfigurable devices such as field programming gate arrays (FPGA). The Machine Learning circuitry 1011 may include FPGA for functioning of the hardware framework and software interface in the AI device 101. The FPGA configuration is generally specified using a hardware description language (HDL). Open computing language (OpenCL) can also be used to function FPGAs.

By way of non-limiting example, the Machine Learning circuitry 1011 may include application specific integrated circuit (ASIC) instead of or with FPGA for better functioning.

By way of non-limiting example, the ML circuitry 1011 may include graphics processing units (GPUs) for manipulation of images. GPUs may also be used but not limited to the calculation of local image properties. GPU accelerated video decoding process can be used to process the video stream data collected by the AI device 101.

By way of non-limiting example, the ML circuitry 1011 may include graphics processing units (GPUs) for manipulation of images. GPUs may also be used but not limited to the calculation of local image properties. GPU accelerated video decoding process can be used to process the video stream data collected by the AI device 101.

By way of non-limiting example, the application circuitry 1012 may include a digital/analog interface. The digital/analog interface may include a mixer and/or a digital signal processor (DSP) and/or an amplifier. The amplifier may be configured to amplify the down-converted signals.

In some embodiments, the output signals and the input signals may be analog signals, although the scope of the embodiments is not limited in this respect. In some alternative embodiments, the output signals and the input signals may be digital signals. In such embodiments, the application circuitry 1012 may include analog-to-digital converter (ADC) and digital to analog converter (DAC) circuitry, the application circuitry 1012 may include analog/digital interface to communicate with the low-data rate circuitry 1013.

In some embodiments, the analog/digital interface in the application circuitry 1012 may include one or more digital signal processor(s) (DSP). The DSP(s) may include elements for compression/decompression and echo cancellation and other suitable processing elements.

The application circuitry 1012 may be configured to process data received from the low data-rate circuitry 1013. The application circuitry 1012 may also be configured to send data to the low data-rate circuitry 1013. The application circuitry 1012 may interface with the Machine Learning circuitry 1011 for generating and processing the data received from the low data-rate circuitry 1013 using a hardware accelerator, and for controlling operations of the Machine learning circuitry 1011.

The application circuitry 1012 may further include memory/storage. The memory/storage may include data and/or instructions for operations performed by the processors of the application circuitry 1012 stored thereon. In some embodiments, the memory/storage may include any combination of suitable volatile memory and/or non-volatile memory. The memory/storage may include any combinations of various levels of memory/storage including but not limited to read-only memory (ROM) having embedded software instructions (e.g., firmware), random access memory (RAM), cache, buffers, etc. In some embodiments, the memory/storage may be shared among the various processors or dedicated to particular processors.

Components of the application circuitry 1012 may be suitably combined in a single chip or a single chipset, or disposed on a same circuit board in some embodiments, some or all of the constituent components of the application circuitry 1012 and the ML circuitry 1011 may be implemented together, such as, for example, on a system on a chip (SOC).

The low data-rate circuitry 1013 may include one or more modulator(s). The modulator(s) can be used to perform the process of modulation by varying one or more properties of the periodic waveform (e.g., carrier signal), with the modulating signal that contains information to be transmitted via a low data-rate transceiver. The low data-rate circuitry 1013 can also contain a demodulator for the inverse action of modulation or a modulator-demodulator (modem).

In some embodiments, the low data-rate circuitry 1013 may provide for communication compatible with low data-rate radio frequencies. Embodiments, in which the low data-rate circuitry 1013 is configured to support radio communication.

In some embodiments, low data-rate circuitry 1013 may include an antenna 1014 for enabling communication with the wireless networks. The low data-rate circuitry 1013 may include a receive signal path which may include circuitry to down-convert the received information from the device server over low data-rate gateway/base stations. The low data-rate circuitry 1013 may include a transmit signal path which may include circuitry to up-convert data received from the application circuitry 101 and provide output signals to the antenna 1014 for transmission.

The low data-rate circuitry 1013 may include Radio frontend circuitry. In some mode embodiments, separate radio IC circuitry may be provided for processing signals, although scope of the embodiments is not limited in this respect.

In some embodiments, frequency input may be provided by a voltage-controlled oscillator (VCO), although that is not a requirement. The divider control input may be provided by either the low data-rate circuitry 1013 or the application circuitry 1012 depending on the desired output.

The low data-rate circuitry 1013 may include circuitry configured to operate RF signals received from one or more antennas 1014, amplify the received signals, provide amplified versions of received signals to the application circuitry 1012 for further processing. The low data-rate circuitry 1013 may include circuitry to transmit signals received from the application circuitry 1012 by at least one of the one or more antennas 1014.

In some embodiments, the low data-rate circuitry 1013 may include a low data-rate transceiver with TX/RX switch configured to switch between a transmit mode and a receive mode. The low data-rate circuitry 1013 may include a receive signal path and a transmit signal path. The receive signal path of the low data-rate circuitry may include a low-noise amplifier (LNA) to amplify received signals and filters.

The low data-rate circuitry 1013 may include a Radio frontend that may handle various radio control functions that enable communication. By way of non-limiting example, the radio control functions may include signal modulation/demodulation. Encoding/decoding, radio frequency shifting, other functions, and combinations thereof.

In some embodiments, the low data-rate circuitry 1013 may be programmed to perform Fast-Fourier Transform (FFT), other functions, and combinations thereof. The low data-rate circuitry 1013 may be configured to carry out frequency shift keying (FSK) modulation scheme. By way of non-limiting example, the low data-rate circuitry 1013 can be configured to use any kind of modulation scheme (e.g., FSK, BFSK).

In some embodiments, the radio front end circuitry may include precoding, constellation, mapping/demapping functions, other functions, and combinations thereof. In some embodiments, encoding/decoding circuitry may be programmed to perform convolutions, tail-biting convolutions, encoder/decoder functions, other functions, and combinations thereof.

In some embodiments, the AI device may be configured to perform one or more processes, techniques, and/or methods as described herein, or portions thereof.

According to some aspects, an apparatus for an Artificial Intelligence (AI) device, is disclosed. The apparatus includes a camera to record the video stream, a ML accelerator for processing the video stream, and a low data-rate transceiver to receive and send processed data. The apparatus includes memory. The apparatus also includes a microcontroller designed to access the memory. The microcontroller is designed to activate the processing of the ML accelerator and low data-rate transceiver communication.

According to further aspects, the AI device uses ML accelerator to process the video stream and sends the data to the database via the low data-rate transceiver.

According to further aspects, the low data-rate transceiver implements low data-rate transmission using low data-rate radiofrequency RF like Lora, NB-IoT, or Sigfox.

According to further aspects, the ML accelerator and microcontroller are further designed to process the video stream captured through the camera.

According to further aspects, the one or more processors are designed to further send the processed data using ML accelerator via the low data-rate transceiver.

According to further aspects, the one or more processors are designed to receive the data from the database via the low data-rate transceiver.

According to further aspects, e the AI device is also used for training other AI models using an AI training platform.

According to further aspects, the ML accelerator communicates with the device server to register on the device network with programmed software and hardware.

According to further aspects, the data visualization identifies the video data and communicates with the AI device via the device server.

According to further aspects, the ML accelerator finds the recognizable pattern through ML computing. According to further aspects, the video recognition information from the database is communicated to the AI device via low data-rate gateway/base stations by the low data-rate transceiver.

According to further aspects, the low data-rate transceiver sends a low data-rate packet through gateway/base stations to the device server.

According to further aspects, the internal configuration of the AI device is changed as per instructions by the device server.

According to some aspects, the apparatus is for a device, is disclosed. Further, the apparatus includes an AI device with a low data-rate transceiver to receive and send data. The apparatus includes memory, data visualization. The apparatus includes one or more processors designed to access the memory, the low data-rate transceiver. The microcontroller is designed to receive downlink data through a low data-rate network.

According to further aspects, the communication between the AI device and Data visualization is a secured session.

According to further aspects, the authentication is established using a key between the AI device and data visualization. According to further aspects, the key can be a random number and/or combination of characters and numbers.

According to further aspects, the data visualization subscribes to the data sent by the AI device. The AI device signs the data using the key.

According to further aspects, after signing data is published by the AI device towards the data visualization by the AI device.

According to further aspects, the video recognition is established on both the ends of the communication between the AI device and data visualization.

According to further aspects, the data is MQTT encrypted when sent and/or received from the device server to and/or received from the data visualization.

According to further aspects, the communication between the device server and low data-rate transceiver takes place by sending and/or receiving low data-rate protocol encrypted packets.

According to further aspects, the on-board communication between ML accelerator and the low data-rate transceiver is on-board.

According to further aspects, the video stream recognition information is generated by the data visualization.

According to some aspects, a method is disclosed. The method includes video recognition by transmitting a low data-rate radio frequency (RF) signal with Machine Learning (ML) hardware acceleration. In particular, this method is about Artificial Intelligence (AI) recognition of video through ML and transmission of the data by low data-rate RF like Lora, NB-IoT, or Sigfox.

According to further aspects, the AI device uses ML accelerator to process the video stream and sends the data to the database via a low data-rate transceiver.

According to further aspects, the low data-rate transceiver implements low data-rate transmission using low data-rate radiofrequency RF like Lora, NB-IoT, or Sigfox.

According to further aspects, the ML accelerator and microcontroller are further designed to process the video stream captured through the camera.

According to further aspects, the one or more processors are designed to further send the processed data using ML accelerator via the low data-rate transceiver.

According to further aspects, the one or more processors are designed to receive the data from the database via the low data-rate transceiver.

According to further aspects, the AI device is also used for training other AI models using an AI training platform.

According to further aspects, the ML accelerator communicates with the device server to register on the device network with programmed software and hardware.

According to further aspects, the data visualization identifies the video data and communicates with the AI device via the device server.

According to further aspects, the ML accelerator finds the recognizable pattern through ML computing.

According to further aspects, the video recognition information from the database is communicated to the AI device via low data-rate gateway/base stations by the low data-rate transceiver.

According to further aspects, the low data-rate transceiver sends a low data-rate packet through gateway/base stations to the device server.

According to further aspects, the internal configuration of the AI device is changed as per instructions by the device server.

According to further aspects, the communication between the AI device and Data visualization is a secured session.

According to further aspects, the authentication is established using a key between the AI device and data visualization.

According to further aspects, the key can be a random number and/or combination of characters and numbers.

According to further aspects, the data visualization subscribes to the data sent by the AI device. The AI device signs the data using the key and after signing data is published by the AI device towards the data visualization by the AI device.

According to further aspects, the video recognition is established on both the ends of the communication between the AI device and data visualization.

According to further aspects, the data is MQTT encrypted when sent and/or received from the device server to and/or received from the data visualization.

According to further aspects, the communication between the device server and low data-rate transceiver takes place by sending and/or receiving low data-rate protocol encrypted packets.

According to further aspects, the on-board communication between ML accelerator and the low data-rate transceiver is on-board.

According to further aspects, the video stream recognition information is generated by the data visualization.

According to some aspects, an apparatus for an AI device is disclosed. Further, the apparatus may include a camera to record video stream/data, a machine learning (ML) accelerator for video recognition, a low data-rate transceiver to send and/or receive data from the device server connected to one or more antenna, a microcontroller to control the functions such as sending/receiving data to/from low, a data-rate transceiver, an internal memory (e.g., ROM), an interface to connect external software/hardware, a low data-rate gateways/base stations, a device server, a database for storing all the data, and data visualization.

According to further aspects, the camera can be any camera used to capture video streaming.

According to further aspects, the ML accelerator is used for video recognition using the captured data.

According to further aspects, the low data-rate transceiver sends/receives data using low data-rate radiofrequency.

According to further aspects, the microcontroller processes the data with an ML accelerator and sends the processed data using the low data-rate transceiver.

According to further aspects, the internal memory contains segments of data that can be accessed in real time.

According to further aspects, the processed data is sent to and/or received from the device server using low data-rate gateway/base stations.

According to further aspects, the device server connects with the database through the internet.

According to further aspects, the database contains the processed data that is utilized for video recognition. The data is also used to train similar AI models.

According to further aspects, the data visualization is where the AI device sends a small amount of processed data to cloud for data visualization.

According to further aspects, the data processed is sent through a secured session. The authentication session is established and data can only be shared using a key.

According to some aspects, an apparatus for a device is disclosed. Further, the apparatus comprises an AI device for capturing and processing video stream using ML accelerator, a low data-rate transceiver to send/receive processed data using low data-rate RF, a low data-rate gateway/base stations as means for sending/receiving data, a device server mediator for connection between the device and the cloud, and a data visualization for visualizing processed data and video recognition.

According to further aspects, a secure session is established between the AI device and the data visualization by sharing a key. According to further aspects, a key can be any random number or combination of characters and numbers.

According to further aspects, the data visualization subscribes to the data sent by the AI device. The AI device signs the data using the key.

According to further aspects, after signing data is published by the AI device towards the data visualization by the AI device.

According to further aspects, the data is MQTT encrypted when sent and/or received from the device server to and/or received from the data visualization.

According to further aspects, the processed data is sent to the data visualization for video recognition.

According to further aspects, the information regarding video recognition is communicated through data visualization.

Figure 11:
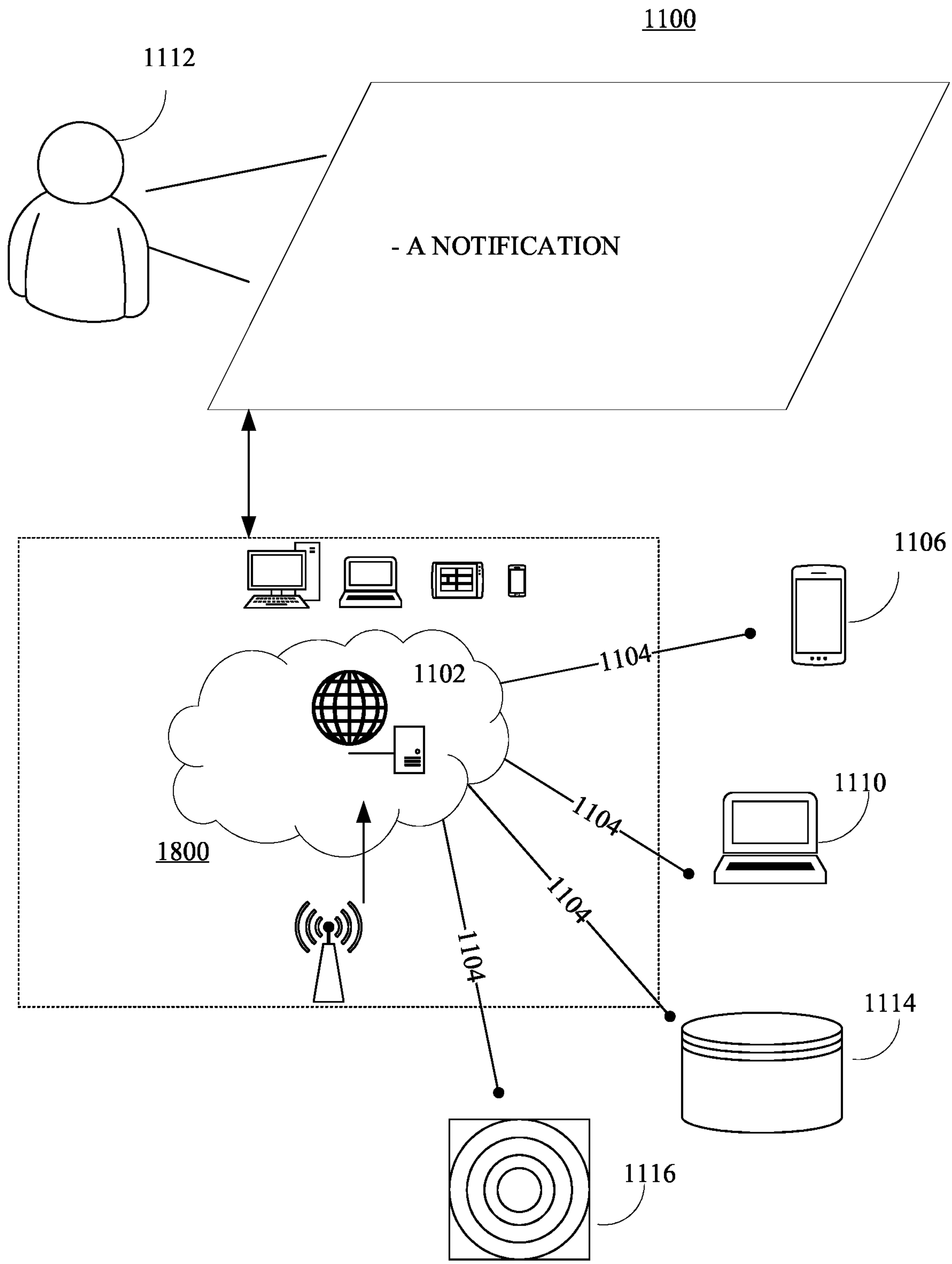
FIG. 11 is an illustration of an online platform consistent with various embodiments of the present disclosure.

FIG. 11 is an illustration of an online platform 1100 consistent with various embodiments of the present disclosure. By way of non-limiting example, the online platform 1100 to facilitate managing incidents occurring in areas monitored by low data-rate monitoring devices using the low data-rate monitoring devices may be hosted on a centralized server 1102, such as, for example, a cloud computing service. The centralized server 1102 may communicate with other network entities, such as, for example, a mobile device 1106 (such as a smartphone, a laptop, a tablet computer, etc.), other electronic devices 1110 (such as desktop computers, server computers, etc.), databases 1114, and sensors 1116 over a communication network 1104, such as, but not limited to, the Internet. Further, users of the online platform 1100 may include relevant parties such as, but not limited to, end-users, administrators, service providers, service consumers, and so on. Accordingly, in some instances, electronic devices operated by the one or more relevant parties may be in communication with the platform.

A user 1112, such as the one or more relevant parties, may access online platform 1100 through a web based software application or browser. The web based software application may be embodied as, for example, but not be limited to, a website, a web application, a desktop application, and a mobile application compatible with a computing device 1800.

Figure 12:
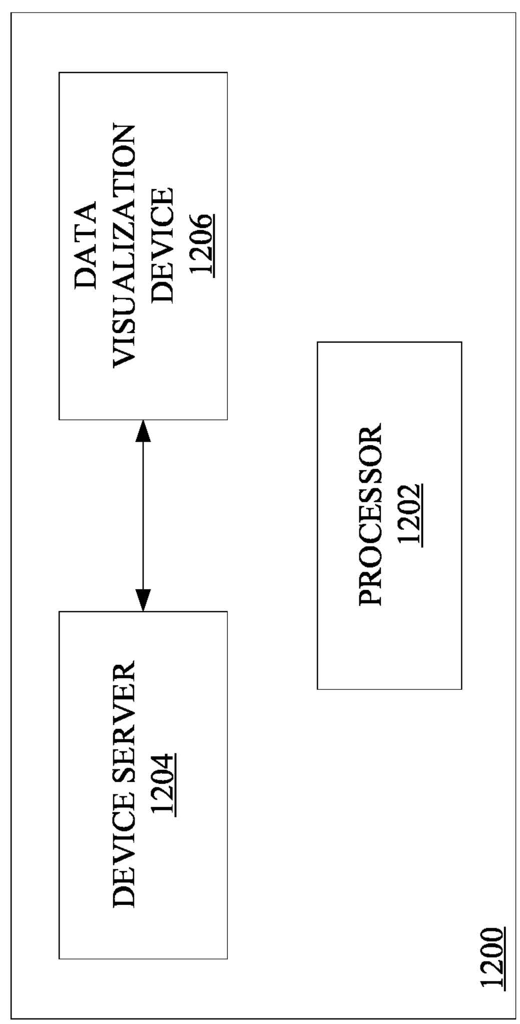
FIG. 12 is a block diagram of a system for facilitating managing incidents occurring in areas monitored by low data-rate monitoring devices using the low data-rate monitoring devices, in accordance with some embodiments.

FIG. 12 is a block diagram of a system 1200 for facilitating managing incidents occurring in areas monitored by low data-rate monitoring devices using the low data-rate monitoring devices, in accordance with some embodiments. Further, the system 1200 may include a processor 1202, a device server 1204, and a data visualization device 1206.

Figure 13:
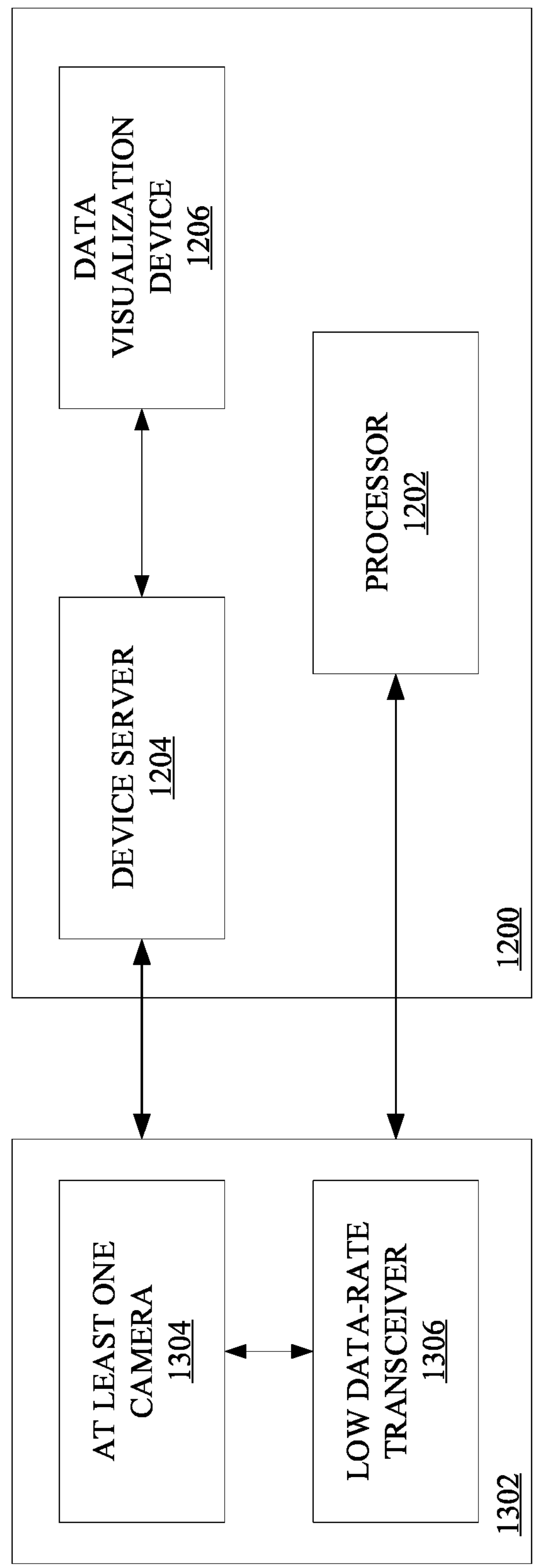
FIG. 13 is a block diagram of the system with the at least one low data-rate monitoring device, in accordance with some embodiments.

Further, the processor 1202 may be configured to be communicatively coupled with at least one low data-rate monitoring device 1302, as shown in FIG. 13. Further, the at least one low data-rate monitoring device 1302 may include security cameras, fire detection cameras, parking cameras, etc. Further, the least one low data-rate monitoring device 1302 may include at least one camera 1304, as shown in FIG. 13, and a low data-rate transceiver 1306, as shown in FIG. 13. Further, the at least one camera 1304 and the low data-rate transceiver 1306 may be communicatively coupled. Further, the at least one camera 1304 may be configured for capturing at least one video of at least one area. Further, the at least one video may include at least one image. Further, the processor 1202 may include a machine learning (ML) hardware accelerator. Further, the ML hardware accelerator may be configured for performing machine learning processing of the at least one video for performing video recognition based on the capturing. Further, the processor 1202 may be configured for generating processed data based on the performing of the machine learning processing. Further, the processed data may include a result obtained from the at least one video based on the performing of the machine learning processing.

Further, the device server 1204 may be communicatively coupled with the least one low data-rate monitoring device 1302. Further, the low data-rate transceiver 1306 may be configured for transmitting the processed data to the device server 1204. Further, the device server 1204 may be configured for receiving the processed data based on the transmitting of the processed data. Further, the device server 1204 may be configured for transmitting a notification to at least one device. Further, in an embodiment, the at least one device may include a presentation device. Further, the presentation device may be configured for presenting the notification to at least one user.

Further, the data visualization device 1206 may be communicatively coupled with the device server 1204. Further, the data visualization device 1206 may be configured for visualizing the processed data. Further, the data visualization device 1206 may be configured for identifying an incident in the at least one area based on the visualizing. Further, the incident may include a theft incident, a fire incident, a wrong parking incident, a trespassing incident, etc. Further, the data visualization device 1206 may be configured for generating the notification for the incident based on the identifying.

Figure 15:
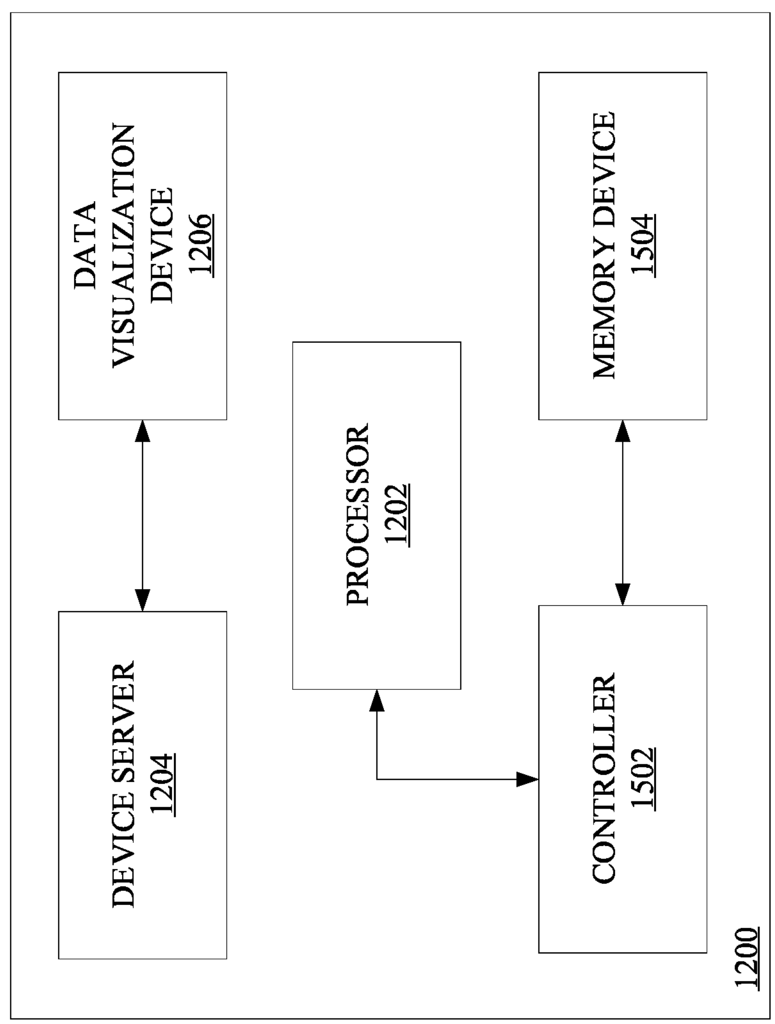
FIG. 15 is a block diagram of the system, in accordance with some embodiments.

In further embodiments, a controller 1502, as shown in FIG. 15, may be communicatively coupled with the processor 1202. Further, controller may include a microcontroller. Further, the controller 1502 may be configured for activating the ML hardware accelerator based on a ML accelerator schedule. Further, the performing of the machine learning processing of the at least one video may be based on the activating of the ML hardware accelerator. Further, a memory device 1504, as shown in FIG. 15, may be communicatively coupled with the controller 1502. Further, the memory device 1504 may be configured for storing the ML accelerator schedule. Further, in an embodiment, the controller 1502 may be communicatively coupled with the low data-rate transceiver 1306. Further, the controller 1502 may be configured for activating the low data-rate transceiver 1306 based on a transceiver schedule. Further, the transmitting of the processed data may be based on the activating of the low data-rate transceiver 1306. Further, the memory device 1504 may be configured for storing the transceiver schedule.

Further, in some embodiments, the at least one camera 1304 may include a plurality of first cameras. Further, the plurality of first cameras may be configured for collectively capturing a plurality of first videos. Further, the at least one video may include the plurality of first videos.

Further, in some embodiments, the at least one camera 1304 may include a plurality of second cameras. Further, the plurality of second cameras may be configured for independently capturing a plurality of second videos. Further, the at least one video may include the plurality of second videos.

Further, in some embodiments, the low data-rate transceiver 1306 may be associated with a low data-rate radiofrequency. Further, the low data-rate transceiver 1306 uses the low data-rate radiofrequency for the transmitting of the processed data to the device server 1204

Figure 14:
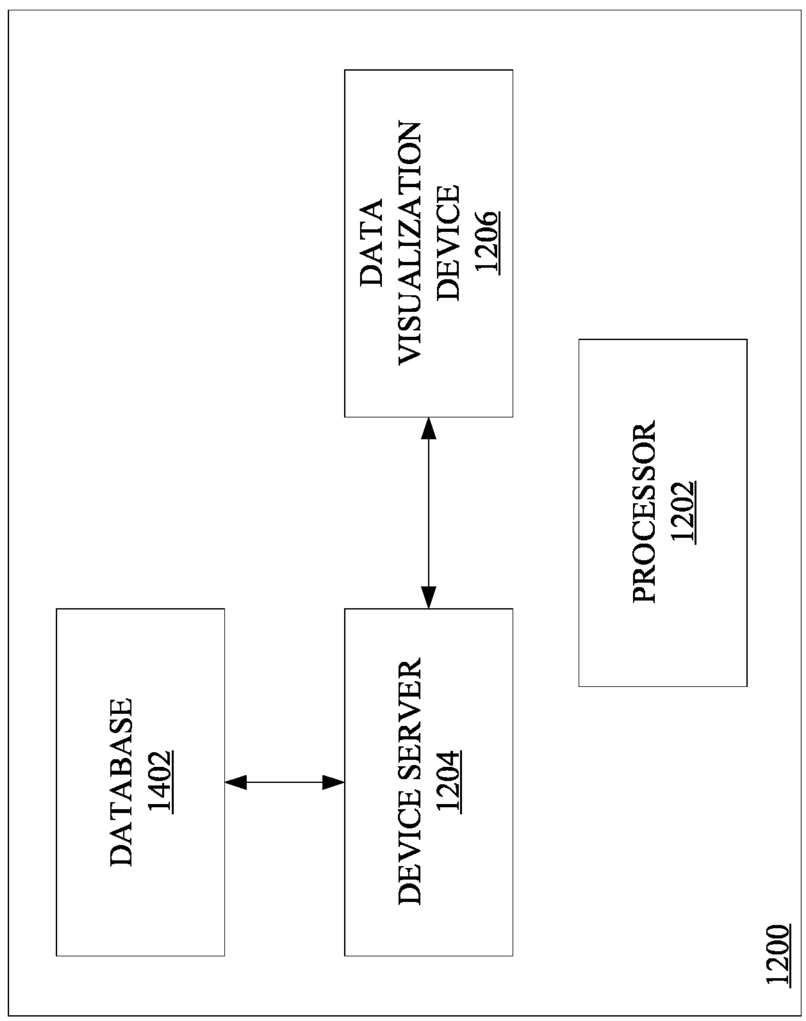
FIG. 14 is a block diagram of the system, in accordance with some embodiments.

In further embodiments, a database 1402, as shown in FIG. 14, may be communicatively coupled with the device server 1204. Further, the database 1402 may be configured for storing the processed data.

In further embodiments, a controller (not shown) may be communicatively coupled with the at least one low data-rate monitoring device 1302. Further, the device server 1204 may be configured for receiving at least command from the at least one device. Further, the controller may be configured for modifying at least one internal configuration of the at least one low data-rate monitoring device 1302. Further, the at least one internal configuration may include an active time, an active duration, a sleep time, a sleep duration, etc. of the at least one low data-rate monitoring device 1302. Further, at least one of the capturing of the at least one video and the transmitting of the processed data may be based on the modifying.

Further, in some embodiments, the at least one low data-rate monitoring device 1302 may include an internal memory. Further, the internal memory may be communicatively coupled with the at least one camera 1304 and the low data-rate transceiver 1306. Further, the internal memory may be configured for storing at least one of the at least one video and the processed data.

Figure 16:
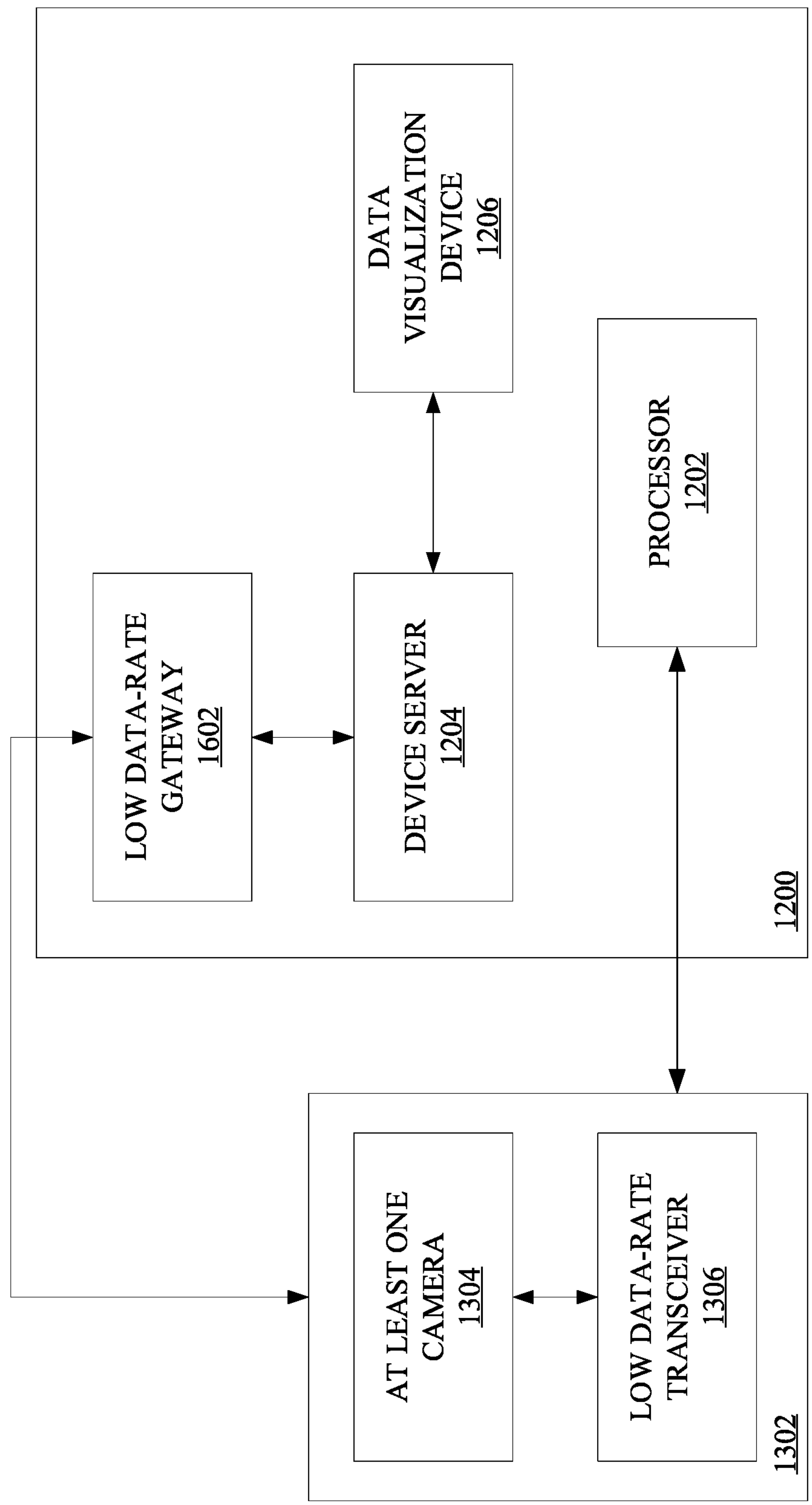
FIG. 16 is a block diagram of the system with the at least one low data-rate monitoring device, in accordance with some embodiments.

In further embodiments, a low data-rate gateway 1602, as shown in FIG. 16, may be communicatively coupled with the at least one low data-rate monitoring device 1302 and the device server 1204. Further, the low data-rate transceiver 1306 may be configured for communicating with the device server 1204 over an internet using the low data-rate gateway 1602. Further, the transmitting of the processed data may be based on the communicating.

Further, in some embodiments, the ML hardware accelerator may be configured for segmenting the at least one video. Further, the ML hardware accelerator may be configured for generating one or more segments of the at least one video based on the segmenting. Further, the ML hardware accelerator may be configured for determining a relevance of the one or more segments based on the performing of the machine learning processing of the at least one video. Further, the ML hardware accelerator may be configured for identifying at least one segment of the one or more segments based on determining. Further, the generating of the processed data may be based on the identifying. Further, a processed data size of the processed data may be smaller than a video data size of the at least one video.

In further embodiments, an artificial intelligence (AI) training platform may be communicatively coupled with the at least one low data-rate monitoring device 1302. Further, the AI training platform may be configured for training one or more artificial intelligence (AI) models associated with the AI training platform using the processed data. Further, the one or more AI models may be configured for incident detection based on the training. Further, the AI training platform may be communicatively coupled with the database 1402. Further, the database 1402 may be configured for storing the one or more AI models. Further, the visualizing of the processed data may include analyzing the processed data using a AI model of the one or more AI models. Further, the identifying of the incident may be based on the analyzing of the processed data using the AI model.

FIG. 13 is a block diagram of the system 1200 with the at least one low data-rate monitoring device 1302, in accordance with some embodiments.

FIG. 14 is a block diagram of the system 1200, in accordance with some embodiments.

FIG. 15 is a block diagram of the system 1200, in accordance with some embodiments.

FIG. 16 is a block diagram of the system 1200 with the at least one low data-rate monitoring device 1302, in accordance with some embodiments.

Figure 17:
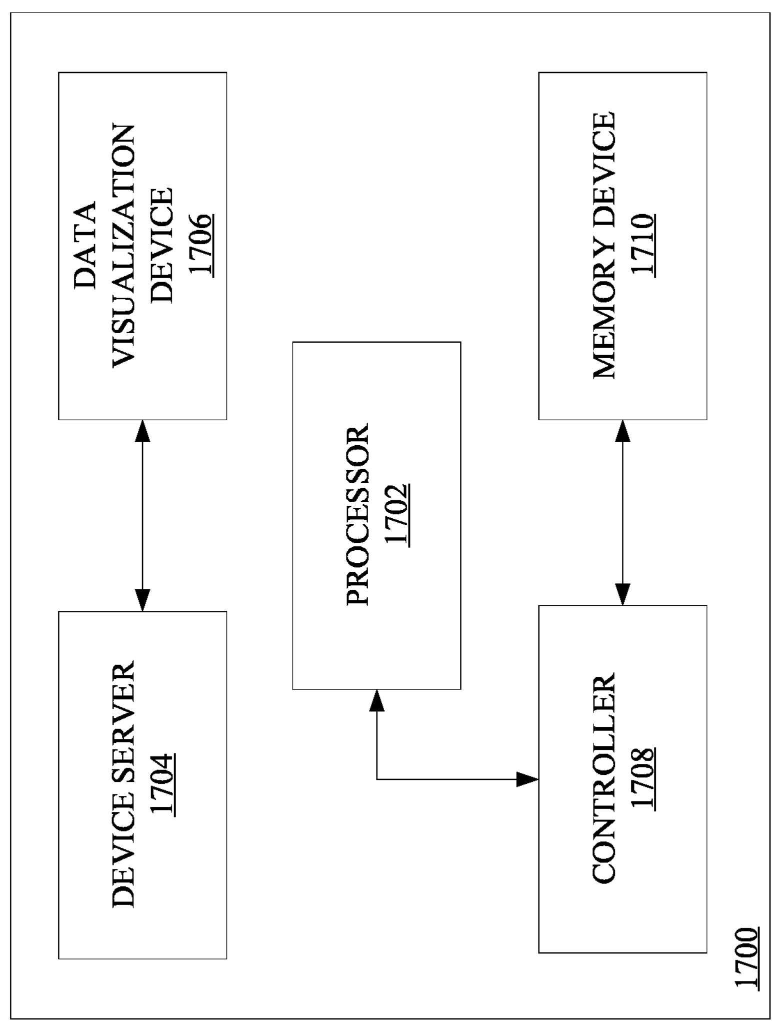
FIG. 17 is a block diagram of a system for facilitating managing incidents occurring in areas monitored by low data-rate monitoring devices using the low data-rate monitoring devices, in accordance with some embodiments.

FIG. 17 is a block diagram of a system 1700 for facilitating managing incidents occurring in areas monitored by low data-rate monitoring devices using the low data-rate monitoring devices, in accordance with some embodiments. Further, the system 1700 may include a processor 1702, a device server 1704, a data visualization device 1706, a controller 1708, and a memory device 1710.

Further, the processor 1702 may be configured to be communicatively coupled with at least one low data-rate monitoring device. Further, the least one low data-rate monitoring device may include at least one camera and a low data-rate transceiver. Further, the at least one camera and the low data-rate transceiver may be communicatively coupled. Further, the at least one camera may be configured for capturing at least one video of at least one area. Further, the processor 1702 may include a machine learning (ML) hardware accelerator. Further, the ML hardware accelerator may be configured for performing machine learning processing of the at least one video for performing video recognition based on the capturing. Further, the processor 1702 may be configured for generating processed data based on the performing of the machine learning processing.

Further, the device server 1704 may be communicatively coupled with the least one low data-rate monitoring device. Further, the low data-rate transceiver may be configured for transmitting the processed data to the device server 1704. Further, the device server 1704 may be configured for receiving the processed data based on the transmitting of the processed data. Further, the device server 1704 may be configured for transmitting a notification to at least one device.

Further, the data visualization device 1706 may be communicatively coupled with the device server 1704. Further, the data visualization device 1706 may be configured for visualizing the processed data. Further, the data visualization device 1706 may be configured for identifying an incident in the at least one area based on the visualizing. Further, the data visualization device 1706 may be configured for generating the notification for the incident based on the identifying.

Further, the controller 1708 may be communicatively coupled with the processor 1702. Further, the controller 1708 may be configured for activating the ML hardware accelerator based on a ML accelerator schedule. Further, the performing of the machine learning processing of the at least one video may be based on the activating of the ML hardware accelerator.

Further, the memory device 1710 may be communicatively coupled with the controller 1708. Further, the memory device 1710 may be configured for storing the ML accelerator schedule.

Further, in some embodiments, the controller 1708 may be communicatively coupled with the low data-rate transceiver. Further, the controller 1708 may be configured for activating the low data-rate transceiver based on a transceiver schedule. Further, the transmitting of the processed data may be based on the activating of the low data-rate transceiver. Further, the memory device 1710 may be configured for storing the transceiver schedule.

Further, in some embodiments, the at least one camera may include a plurality of first cameras. Further, the plurality of first cameras may be configured for collectively capturing a plurality of first videos. Further, the at least one video may include the plurality of first videos.

Further, in some embodiments, the at least one camera may include a plurality of second cameras. Further, the plurality of second cameras may be configured for independently capturing a plurality of second videos. Further, the at least one video may include the plurality of second videos.

Further, in some embodiments, the low data-rate transceiver may be associated with a low data-rate radiofrequency. Further, the low data-rate transceiver uses the low data-rate radiofrequency for the transmitting of the processed data to the device server 1704.

In further embodiments, a database may be communicatively coupled with the device server 1704. Further, the database may be configured for storing the processed data Further, in some embodiments, the at least one low data-rate monitoring device may include an internal memory. Further, the internal memory may be communicatively coupled with the at least one camera and the low data-rate transceiver. Further, the internal memory may be configured for storing at least one of the at least one video and the processed data.

In further embodiments, a low data-rate gateway may be communicatively coupled with the at least one low data-rate monitoring device and the device server 1704. Further, the low data-rate transceiver may be configured for communicating with the device server 1704 over an internet using the low data-rate gateway. Further, the transmitting of the processed data may be based on the communicating.

Figure 18:
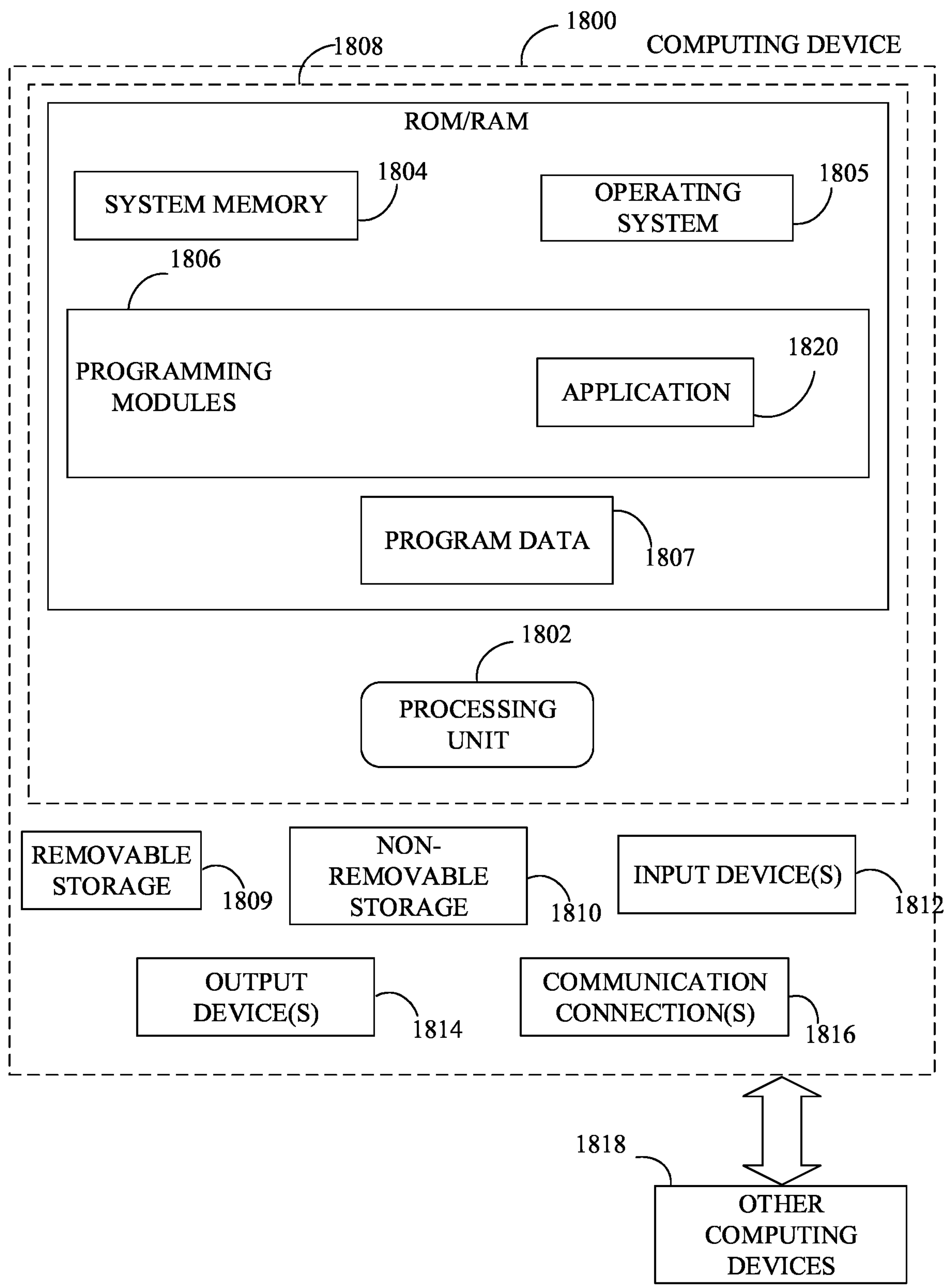
FIG. 18 is a block diagram of a computing device for implementing the methods disclosed herein, in accordance with some embodiments.

With reference to FIG. 18, a system consistent with an embodiment of the disclosure may include a computing device or cloud service, such as computing device 1800. In a basic configuration, computing device 1800 may include at least one processing unit 1802 and a system memory 1804. Depending on the configuration and type of computing device, system memory 1804 may comprise, but is not limited to, volatile (e.g. random-access memory (RAM)), non-volatile (e.g. read-only memory (ROM)), flash memory, or any combination. System memory 1804 may include operating system 1805, one or more programming modules 1806, and may include a program data 1807. Operating system 1805, for example, may be suitable for controlling computing device 1800's operation. In one embodiment, programming modules 1806 may include image-processing module, machine learning module. Furthermore, embodiments of the disclosure may be practiced in conjunction with a graphics library, other operating systems, or any other application program and is not limited to any particular application or system. This basic configuration is illustrated in FIG. 18 by those components within a dashed line 1808.

Computing device 1800 may have additional features or functionality. For example, computing device 1800 may also include additional data storage devices (removable and/or non-removable) such as, for example, magnetic disks, optical disks, or tape. Such additional storage is illustrated in FIG. 18 by a removable storage 1809 and a non-removable storage 1810. Computer storage media may include volatile and non-volatile, removable and non-removable media implemented in any method or technology for storage of information, such as computer-readable instructions, data structures, program modules, or other data. System memory 1804, removable storage 1809, and non-removable storage 1810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1800. Any such computer storage media may be part of device 1800. Computing device 1800 may also have input device(s) 1812 such as a keyboard, a mouse, a pen, a sound input device, a touch input device, a location sensor, a camera, a biometric sensor, etc. Output device(s) 1814 such as a display, speakers, a printer, etc. may also be included. The aforementioned devices are examples and others may be used.

Computing device 1800 may also contain a communication connection 1816 that may allow device 1800 to communicate with other computing devices 1818, such as over a network in a distributed computing environment, for example, an intranet or the Internet. Communication connection 1816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1804, including operating system 1805. While executing on processing unit 1802, programming modules 1806 (e.g., application 1820 such as a media player) may perform processes including, for example, one or more stages of methods, algorithms, systems, applications, servers, databases as described above. The aforementioned process is an example, and processing unit 1802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A system for facilitating managing incidents occurring in areas monitored by low data-rate monitoring devices using the low data-rate monitoring devices, the system comprising:

a processor configured to be communicatively coupled with at least one low data-rate monitoring device, wherein the least one low data-rate monitoring device comprises at least one camera and a low data-rate transceiver, wherein the at least one camera and the low data-rate transceiver are communicatively coupled, wherein the at least one camera is configured for capturing at least one video of at least one area, wherein the processor comprises a machine learning (ML) hardware accelerator, wherein the ML hardware accelerator is configured for performing machine learning processing of the at least one video for performing video recognition based on the capturing, wherein the processor is configured for generating processed data based on the performing of the machine learning processing;

a device server communicatively coupled with the least one low data-rate monitoring device, wherein the low data-rate transceiver is configured for transmitting the processed data to the device server, wherein the device server is configured for:

receiving the processed data based on the transmitting of the processed data; and transmitting a notification to at least one device; and a data visualization device communicatively coupled with the device server, wherein the data visualization device is configured for:

visualizing the processed data;

identifying an incident in the at least one area based on the visualizing; and generating the notification for the incident based on the identifying.

2. The system of claim 1 further comprising a controller communicatively coupled with the processor, wherein the controller is configured for activating the ML hardware accelerator based on a ML accelerator schedule, wherein the performing of the machine learning processing of the at least one video is based on the activating of the ML hardware accelerator; and a memory device communicatively coupled with the controller, wherein the memory device is configured for storing the ML accelerator schedule.

3. The system of claim 2, wherein the controller is communicatively coupled with the low data-rate transceiver, wherein the controller is further configured for activating the low data-rate transceiver based on a transceiver schedule, wherein the transmitting of the processed data is based on the activating of the low data-rate transceiver, wherein the memory device is further configured for storing the transceiver schedule.

4. The system of claim 1, wherein the at least one camera comprises a plurality of first cameras, wherein the plurality of first cameras are configured for collectively capturing a plurality of first videos, wherein the at least one video comprises the plurality of first videos.

5. The system of claim 1, wherein the at least one camera comprises a plurality of second cameras, wherein the plurality of second cameras are configured for independently capturing a plurality of second videos, wherein the at least one video comprises the plurality of second videos.

6. The system of claim 1, wherein the low data-rate transceiver is associated with a low data-rate radiofrequency, wherein the low data-rate transceiver uses the low data-rate radiofrequency for the transmitting of the processed data to the device server.

7. The system of claim 1 further comprising a database communicatively coupled with the device server, wherein the database is configured for storing the processed data.

8. The system of claim 1 further comprising a controller communicatively coupled with the at least one low data-rate monitoring device, wherein the device server is further configured for receiving at least command from the at least one device, wherein the controller is configured for modifying at least one internal configuration of the at least one low data-rate monitoring device, wherein at least one of the capturing of the at least one video and the transmitting of the processed data is based on the modifying.

9. The system of claim 1, wherein the at least one low data-rate monitoring device comprises an internal memory, wherein the internal memory is communicatively coupled with the at least one camera and the low data-rate transceiver, wherein the internal memory is configured for storing at least one of the at least one video and the processed data.

10. The system of claim 1 further comprising a low data-rate gateway communicatively coupled with the at least one low data-rate monitoring device and the device server, wherein the low data-rate transceiver is configured for communicating with the device server over an internet using the low data-rate gateway, wherein the transmitting of the processed data is based on the communicating.

11. The system of claim 1, wherein the ML hardware accelerator is further configured for:

segmenting the at least one video;

generating one or more segments of the at least one video based on the segmenting;

determining a relevance of the one or more segments based on the performing of the machine learning processing of the at least one video; and identifying at least one segment of the one or more segments based on determining, wherein the generating of the processed data is further based on the identifying, wherein a processed data size of the processed data is smaller than a video data size of the at least one video.

12. The system of claim 1 further comprising an artificial intelligence (AI) training platform communicatively coupled with the at least one low data-rate monitoring device, wherein the AI training platform is configured for training one or more artificial intelligence (AI) models associated with the AI training platform using the processed data, wherein the one or more AI models is configured for incident detection based on the training, wherein the AI training platform is communicatively coupled with the database, wherein the database is configured for storing the one or more AI models, wherein the visualizing of the processed data comprises analyzing the processed data using a AI model of the one or more AI models, wherein the identifying of the incident is further based on the analyzing of the processed data using the AI model.

13. A system for facilitating managing incidents occurring in areas monitored by low data-rate monitoring devices using the low data-rate monitoring devices, the system comprising:

a processor configured to be communicatively coupled with at least one low data-rate monitoring device, wherein the least one low data-rate monitoring device comprises at least one camera and a low data-rate transceiver, wherein the at least one camera and the low data-rate transceiver are communicatively coupled, wherein the at least one camera is configured for capturing at least one video of at least one area, wherein the processor comprises a machine learning (ML) hardware accelerator, wherein the ML hardware accelerator is configured for performing machine learning process-ing of the at least one video for performing video recognition based on the capturing, wherein the processor is configured for generating processed data based on the performing of the machine learning processing;

a device server communicatively coupled with the least one low data-rate monitoring device, wherein the low data-rate transceiver is configured for transmitting the processed data to the device server, wherein the device server is configured for:

receiving the processed data based on the transmitting of the processed data; and transmitting a notification to at least one device;

a data visualization device communicatively coupled with the device server, wherein the data visualization device is configured for:

visualizing the processed data;

identifying an incident in the at least one area based on the visualizing; and generating the notification for the incident based on the identifying;

a controller communicatively coupled with the processor, wherein the controller is configured for activating the ML hardware accelerator based on a ML accelerator schedule, wherein the performing of the machine learning processing of the at least one video is based on the activating of the ML hardware accelerator; and a memory device communicatively coupled with the controller, wherein the memory device is configured for storing the ML accelerator schedule.

14. The system of claim 13, wherein the controller is communicatively coupled with the low data-rate transceiver, wherein the controller is further configured for activating the low data-rate transceiver based on a transceiver schedule, wherein the transmitting of the processed data is based on the activating of the low data-rate transceiver, wherein the memory device is further configured for storing the transceiver schedule.

15. The system of claim 13, wherein the at least one camera comprises a plurality of first cameras, wherein the plurality of first cameras are configured for collectively capturing a plurality of first videos, wherein the at least one video comprises the plurality of first videos.

16. The system of claim 13, wherein the at least one camera comprises a plurality of second cameras, wherein the plurality of second cameras are configured for independently capturing a plurality of second videos, wherein the at least one video comprises the plurality of second videos.

17. The system of claim 13, wherein the low data-rate transceiver is associated with a low data-rate radiofrequency, wherein the low data-rate transceiver uses the low data-rate radiofrequency for the transmitting of the processed data to the device server.

18. The system of claim 13 further comprising a database communicatively coupled with the device server, wherein the database is configured for storing the processed data.

19. The system of claim 13, wherein the at least one low data-rate monitoring device comprises an internal memory, wherein the internal memory is communicatively coupled with the at least one camera and the low data-rate transceiver, wherein the internal memory is configured for storing at least one of the at least one video and the processed data.

20. The system of claim 13 further comprising a low data-rate gateway communicatively coupled with the at least one low data-rate monitoring device and the device server, wherein the low data-rate transceiver is configured for communicating with the device server over an internet using the low data-rate gateway, wherein the transmitting of the processed data is based on the communicating.

* * * * *